US010082237B2

(12) United States Patent
Crain et al.

(10) Patent No.: US 10,082,237 B2
(45) Date of Patent: Sep. 25, 2018

(54) IMAGING SYSTEM FOR IMAGING REPLACEMENT PARTS

(71) Applicant: A9.com, Inc., Seattle, WA (US)

(72) Inventors: Jason Crain, New York, NY (US);
Jewel Burks, Atlanta, GA (US);
Nashlie Sephus, New York, NY (US)

(73) Assignee: A9.com, Inc., Palo Alto, CA (US)

( * ) Notice: Subject to any disclaimer, the term of this patent is extended or adjusted under 35 U.S.C. 154(b) by 554 days.

(21) Appl. No.: 14/671,218

(22) Filed: Mar. 27, 2015

(65) Prior Publication Data
US 2016/0284116 A1 Sep. 29, 2016

(51) Int. Cl.
*H04N 5/225* (2006.01)
*F16M 11/18* (2006.01)
*F16M 11/20* (2006.01)
*F16M 11/04* (2006.01)

(52) U.S. Cl.
CPC .......... *F16M 11/18* (2013.01); *F16M 11/041* (2013.01); *F16M 11/2014* (2013.01); *F16M 11/2035* (2013.01); *H04N 5/2252* (2013.01); *G06T 2200/04* (2013.01)

(58) Field of Classification Search
CPC combination set(s) only.
See application file for complete search history.

(56) References Cited

U.S. PATENT DOCUMENTS

| 6,084,592 A | 7/2000 | Shum et al. |
| 6,271,855 B1 | 8/2001 | Shum et al. |
| 7,200,260 B1 | 4/2007 | Watanabe et al. |
| 7,856,125 B2 | 12/2010 | Medioni et al. |
| 8,350,850 B2 | 1/2013 | Steedly et al. |
| 8,655,052 B2 | 2/2014 | Spooner et al. |
| 8,781,255 B2 | 7/2014 | Lin et al. |
| 8,805,116 B2 | 8/2014 | Lin et al. |
| 9,001,120 B2 | 4/2015 | Steedly et al. |
| 9,053,571 B2 | 6/2015 | Shotton et al. |

(Continued)

FOREIGN PATENT DOCUMENTS

WO WO-2014126217 A1 * 8/2014 ............. A61B 6/022

OTHER PUBLICATIONS

The International Search Report and Written Opinion of the International Searching Authority issued in PCT/US2016/024055, dated Jun. 16, 2016.

(Continued)

*Primary Examiner* — Janese Duley
(74) *Attorney, Agent, or Firm* — Hogan Lovells US LLP

(57) ABSTRACT

An imaging system includes a base, an imaging assembly, and a holder assembly. The imaging assembly includes a first arm including a first arm first portion and a first arm second portion distal from the first arm first portion and a second arm including a second arm first portion and a second arm second portion distal from the second arm first portion. The first arm is pivotally mounted on the base and the second arm is pivotally mounted on the first arm second portion. An imaging device is mounted on the second arm second portion. The holder assembly includes a base mount mounted on a platform. A strut is coupled to the base mount, and a gripper is coupled to the strut. The gripper is configured to grip and position a part in line of sight of the imaging device.

20 Claims, 18 Drawing Sheets

(56) References Cited

U.S. PATENT DOCUMENTS

| | | | | |
|---|---|---|---|---|
| 2002/0112582 | A1* | 8/2002 | Young | B23D 49/007 |
| | | | | 83/167 |
| 2008/0181485 | A1* | 7/2008 | Beis | B25J 9/1697 |
| | | | | 382/153 |
| 2008/0256905 | A1* | 10/2008 | Graf | B65B 1/18 |
| | | | | 53/459 |
| 2009/0025199 | A1 | 1/2009 | Hariki et al. | |
| 2009/0249606 | A1* | 10/2009 | Diez | B23K 11/11 |
| | | | | 29/428 |
| 2009/0326324 | A1* | 12/2009 | Munoz Martinez | A61B 34/30 |
| | | | | 600/118 |
| 2011/0265311 | A1 | 11/2011 | Kondo et al. | |
| 2014/0031983 | A1* | 1/2014 | Low | B25J 9/0087 |
| | | | | 700/257 |
| 2014/0277734 | A1* | 9/2014 | Ichimaru | B25J 9/1697 |
| | | | | 700/259 |
| 2017/0100836 | A1* | 4/2017 | Dellon | B25J 9/144 |

OTHER PUBLICATIONS

BBC News, Technology—Intel RealSense 3D depth camera fitted into smartphone (http://www.bbc.com/news/technology-32215577), Apr. 8, 2015.

F. Aflatouni, B. Abiri, A. Rekhi, A. Hajimiri—Nanophotonic coherent imager, Journal of the Optical Society of America, Feb. 19, 2015.

Knies, Rob—Inside Microsoft Research—3-D Scanning Made Tangible for the Masses (http://blogs.technet.com/b/inside_microsoft_research/archive/2013/10/30/3-d-scanning-made-tangible-for-the-masses.aspx), Oct. 30, 2013.

Pelican Imaging—Depth for Augmented and Mixed Reality (http://www.pelicanimaging.com/technology/index.html), Jan. 5, 2015.

Wheeler, Andrew—Microsoft Receives Patent for New 3D Scanning Technology, (http://3dprintingindustry.com/2015/06/24/microsoft-receives-patent-for-new-3d-scanning-technology/2/), Jun. 24, 2015.

Belongie, Serge et al., "Shape Matching and Object Recognition Using Shape Contacts," IEEE Transactions on Pattern Analysis and Machine Intelligence, vol. 24, No. 24, Apr. 2002, 14 pages.

Burges, Christopher J. C., "A Tutorial on Support Vector Machines for Pattern Recognition," Data Mining and Knowledge Discovery 2, 121-197 1998, 43 pages.

Chong, Hamilton Y., et al. "A Perception-based Color Space for Illumination-Invariant Image Processing," ACM Transactions on Graphics (TOG) Proceedings of ACM SIGGRAPH 2008, vol. 27 Issue 3, Aug. 2008 Article. No. 61, 7 pages.

Czurka, Gabriella et al., "Visual Categorization With Bags of Keypoints," ECCV International Workshop on Statistical Learning Computer Vision, Prague, 2004, 16 pages.

Klare, Brendan and Sarkar, Sudeep, "Background Subtraction in Varying Illuminations Using an Ensemble Based on an Enlarged Feature Set," 2012 IEEE Computer Society Conference on Computer Vision and Pattern Recognition Workshops, Jun. 2009; DOI: 10.1109/CVPRW.2009.5204078, 8 pages.

Levine, Martin D. et al., "Image Normalization for Illumination Compensation in Facial Images," Department of Electrical & Computer Engineering & Center for Intelligent Machines, McGill University, Montréal, Canada, Aug. 2004, 12 pages.

Nowak, Eric et al., "Vehicle Categorization: Parts for Speed and Accuracy," *Visual Surveillance and Performance Evaluation of Tracking and Surveillance*, 2005. 2nd Joint IEEE International Workshop on pp. 277,283, Oct. 15-16, 2005,doi: 10.1109/VSPETS. 2005.1570926, 7 pages.

Nunnally, Troy et al., "Intersec: An Interaction System for Network Security Applications," in Submission Proceedings of the IEEE International Conference on Communications (ICC). 2014, 7 pages.

Prokop, Richard et al. "A Survey of Moment-based Techniques for Unoccluded Object Representation Recognition," Journal CVGIP: Graphical Models and Image Processing archive, vol. 54 Issue 5, Sep. 1992, Academic Press, Inc. Orlando, FL, USA, 43 pages.

Singh, Chandan et al., "Performance Analysis of Various Local and Global Shape Descriptors for Image Retrieval," Multimedia Systems, (2013) 19:339-357, published online: Aug. 9, 2012, 19 pages.

Sixtz, Tomas, "Image and Video-based Recognition of Natural Objects," Diploma Thesis, Czech Technical University in Prague, Faculty of Electrical Engineering, May 2011, 62 pages.

Tomasik, Brian et al., "Tagging Products Using Image Classification," Proceeding SIGIR '09 Proceedings of the 32nd international ACM SIGIR conference on Research and development in information retrieval ACM New York, NY, USA © 2009, 8 pages.

Valasoulis, Konstantinos et al., "Probabilistic Shape-based Image Indexing and Retrieval," proceedings of the $17^{th}$ International Conference on Pattern Recognition (ICPR '2004), 4 pages.

Wu, Yanyan et al., "Shape-based Image Retrieval Using Combining Global and Local Shape Features," IEEE Image and Signal Processing, 2009. CISP '09. $2^{nd}$ International Congress on, Oct. 17-19, 2009, 5 pages.

Yogananda, A.P., et al., "A Fast Linear Separability Test by Projection of Positive Points on Subspaces," Proceedings of the $24^{th}$ International Conference on Machine Learning, Corvallis, Oregon, 2007, 8 pages.

Yu, Yinan, et al., "A Novel Algorithm for View and Illumination Invariant Image Matching," IEEE Transactions on Image Processing, vol. 21, No. 1, Jan. 2012, 12 pages.

Zahn, Charles et al., "Fourier Descriptors for Plane Closed Curves," IEEE Transactions on Computers, vol. c-21, No. 3, Mar. 1972, 13 pages.

Zhang, Dengsheng et al., A Comparative Study on Shape Retrieval Using Fourier Descriptors With Different Shape Signatures, Journal of Visual Communication and Image Representation, No. 14 (1). (2003), 9 pages.

3D Part Source Industrial Part Sourcing, Drag & Drop 3D Files for 3D Search, http://www.3dpartsource.com/, 2014.

3DPartFinder, by 3DSEMANTIX—Geometric Search Engine, http://www.3dpartfinder.com/, 2014.

* cited by examiner

IMAGING SYSTEM FOR IMAGING REPLACEMENT PARTS

BACKGROUND

Mechanical machines, particularly those operating in industrial settings, are periodically maintained to keep the machines running efficiently. Similarly, electrical and electronic equipment (e.g., computers, servers, circuit, switch boards, power supply equipment, etc.), vehicles, industrial prime movers, household equipment such as, for example furniture, laboratory equipment (e.g., flasks, vials, ampules, test tubes, etc.) or any other instrument or equipment require periodic maintenance, repair and/or replacement. The parts included in such machines and equipment such as, for example, rivets, screws, bolts, nuts, washers, electrical components (e.g., resistors, capacitors, diodes, transistors, etc.) and the likes often break or wear out, and have to be replaced. Furthermore, consumable parts (e.g., laboratory equipment) have to be periodically reordered. Conventionally, the replacing of such parts involves identification of the part by a user (e.g., a maintenance personnel), searching for replacements parts in supplier catalogs or online and then selecting a replacement part which best matches the part to be replaced based on the users judgment. This is often a very tedious task which can take a substantial amount of time. For example, the serial or identification numbers on the parts to be replaced are often illegible or have worn out making it difficult to identify the part. Furthermore, searching for the replacement part through multiple supplier catalogs can take a long time leading to delay in replacement of the part and thereby, operation of the machine.

SUMMARY

Embodiments described herein relate generally to systems, methods, and computer-readable media for identifying replacement parts using imaging, and particularly to systems for capturing 3-dimensional images of replacement parts.

In some embodiments, an imaging system includes a base, an imaging assembly, and a holder assembly. The imaging assembly includes a first arm and a second arm. The first arm includes a first arm first portion and a first arm second portion distal from the first arm first portion. The first arm is pivotally mounted on the base at the first arm first portion on a first pivot mount. The second arm includes a second arm first portion and a second arm second portion distal from the second arm first portion. The second arm is pivotally mounted on the first arm second portion at the second arm first portion on a second pivot mount. An imaging device is mounted on the second arm second portion.

The holder assembly includes a base mount mounted on a platform coupled to the base. A strut is coupled to the base mount, and a gripper is coupled to the strut. The gripper is configured to grip a part. At least a portion of the gripper is positioned over the base such that the part is in a line of sight of the imaging device. Furthermore, the second arm is rotatable about the second pivot mount to rotate the imaging device about an axis of the system around the part such that the part is imaged from a plurality of angles by the imaging device.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
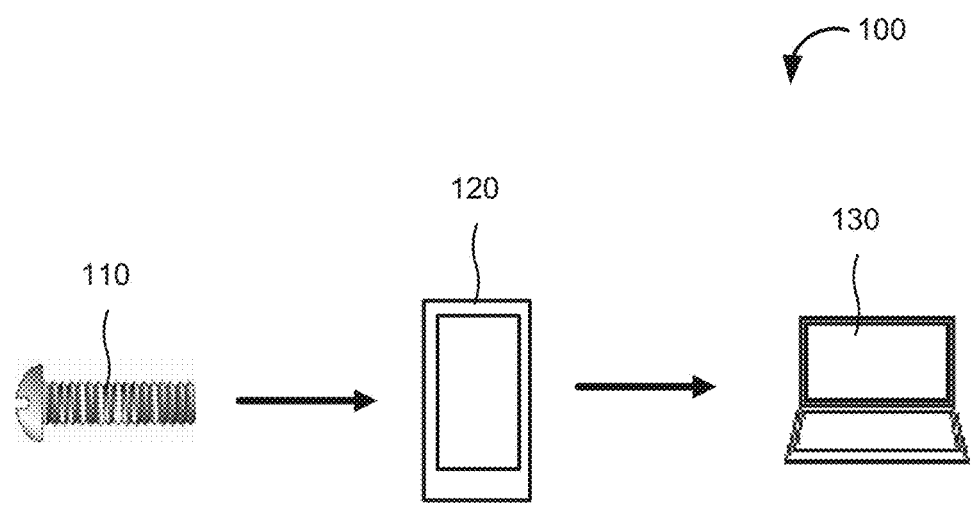
FIG. 1 is a block diagram of a system for identifying replacement parts and extracting a set of features of a test part via a sequence of images, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems, methods, and computer-readable media for identifying replacement parts using imaging, and particularly to imaging systems for capturing 3-dimensional images of replacement parts.

Embodiments described herein provided several advantages over conventional imaging systems including, for example: (1) providing an imaging device including an arm capable of rotating 360 degrees mounted on a second arm capable or rotating 180 degrees thereby providing 3-dimensional imaging capabilities in a plurality of planes; (2) providing capability of manual or automated rotation of the arms to capture images of a test part; and (3) having a simple manually positionable stage mount for positioning a replacement part in an appropriate location for imaging by an imaging device of the imaging system.

As used herein, the term "test part" refers to any part which is to be replaced, and the term "replacement part" refers to a part which replaces the test part.

As user herein, the term "feature" or "features" refers to a physical attributes of a part such as dimension, shape, texture, color, thread count, or any other physical attribute, as well as a computational attribute such as, spectral characteristic, histogram threshold, or any other computational attribute.

FIG. 1 is a block diagram of a system 100 for identifying replacement parts and extracting features via a sequence of images of a test part 110. While shown as being an oval head screw, the test part 110 can include any part which is to be replaced. For example, the test part 110 can include a screw (e.g., a flat head screw, a round head screw, a Phillips head screw, an oval head screw, blunt pan head screw, pointed pan head screw, socket screw, set screw, etc.), a bolt (e.g., a hex bolt, a carriage bolt, a lag bolt, an eye bolt, an elevator bolt, a U-bolt, a J-bolt, a shoulder bolt, etc.), a rivet, a nut (e.g., a hex nut, a heavy hex nut, a nylon insert lock nut, a jam nut, a wing nut, a cap nut, an acorn nut, a flange nut, a tee nut, a square nut, a torque lock nut, etc.), a washer (e.g., a flat washer, a fender washer, a finishing washer, a split lock washer, an external tooth lock washer, an internal tooth lock washer, a square washer, etc.), or any other test part that is to be replaced. In other embodiments, the test part 110 can include any other part or component, for example, automotive components, electrical components, household components, laboratory components, etc.

The system 100 includes an imaging device 120 operable to capture a sequence of images of the test part 110. The imaging device 120 can include, for example, a smart phone or a tablet with an integrated camera, or a camera (e.g., a digital camera). The sequence of images can include multiple images of the test part 110 captured from multiple angles by the imaging device 120. For example, in some embodiments in which the test part 110 is a screw, or a bolt, the sequence of images can include a side view of the test part 110 which captures the thread count, a front head view of the test part 110 which captures the shape and type of the screw head, and a bottom tip view which captures the type of tip (e.g., blunt, chamfered, pointed, etc.) and radius of the screw. In some embodiments, the imaging device 120 can be used to capture a video of the test part 110, for example, a 3-dimensional video. In some embodiments, the image or video of the test part 110 can be captured on a solid background, for example, a white back ground. This can, for example, facilitate extraction of a set of features of the test part 110, as described herein. The set of features can include, for example, a dimension (e.g., length, width, radius, etc.), shape, texture, color, a thread count, a spectral characteristic, a histogram threshold, scale invariant features (e.g., Scale Invariant Feature Transform (SIFT), Speed-up-Robust Feature (SURF), etc.), and/or keypoint features (e.g., Binary Robust Invariant Scalable Keypoints (BRISK), Fast Retina Keypoint (FREAK), Binary Robust Independent Elementary Features (BRIEF), Oriented Fast, and Rotated BRIEF (ORB), etc.). Moreover, in some embodiments, a reference object having known shape, dimensions, color, and/or texture (e.g., a penny) can also be included in the sequence of images or otherwise video of the test part 110. In such embodiments, the reference object serves as a reference having known features which can be correlated to the image of the test part 110 to extract the features of the test part 110 with high fidelity.

The imaging device 120 is operably coupled to a computing device 130. The computing device 130 can include any suitable computing device such as, for example, a smart phone, a tablet, a laptop, a desktop, a local server, or a remote server. In some embodiments, the imaging device 120 and the computing device 130 can be included in a single device which can be configured to capture image of the test part 110 as well as identify replacement parts such as. For example, the computing device 130 can include a smartphone, a tablet, or a computer which includes a camera (i.e., the imaging device) for capturing the image of the test part 110.

The computing device 130 is configured to store a database of a set of features of a plurality of replacement parts. The database stored in the computing device 130 can include details of a set of features of a plurality of replacement parts in a 'bag of words" format (i.e., information in text form e.g., in a group of tables without any figures). This can save memory requirements of the database as well as allowing faster data recovery from the database in relatively short amounts of time. In some embodiments, the computing device 130 can be configured to populate the database of the plurality of replacement parts. For example, the computing device 130 can be configured to crawl, scour, or otherwise skim a plurality of websites of suppliers of one or more of the replacement parts. The computing device 130 can then scrape or otherwise obtain information corresponding to the set of features of one or more of the replacement parts from each of the plurality of websites. In some embodiments, the set of features of one or more replacement parts can be manually entered into the database. For example, information on the set of features of replacement parts that are not available from suppliers websites can be manually entered into the database.

In some embodiments, the set of features of the replacement parts can be added to the database in a batch. For example, a plurality of images of a batch of replacement parts can be captured using an imaging device, for example, the imaging device 120 (e.g., a smart phone camera, a tablet camera, a digital camera, or any other imaging device). The plurality of images of the batch of replacement parts can then be communicated (e.g., uploaded) to the computing device 130 which can then extract the set of features of the batch of replacement parts.

In some embodiments, images of a plurality of replacement parts can be batch or otherwise bulk uploaded into the computing device 130 for extracting the set of features using an automated machine (e.g., the machine 500 described herein) that includes a plurality of imaging devices. The plurality of imaging devices (e.g., cameras) can be disposed at predetermined locations in the automated machine and oriented to capture a plurality of images of the replacement parts disposed in the machine from various angles or otherwise directions. The plurality of images can then be used to extract the set of features of the replacement parts. Furthermore, the machine can include one or more conveyor belts on which the replacement parts can be placed for passing through the machine.

In some embodiments, models of the replacement parts can be trained using images of replacement parts and/or super vector features, which can be Gaussian Mixture Models (GMMs), Convolutional Neural Networks (CNNs), Radial Basis Functions (RBFs), and/or other kernels and a classifier, such as Support Vector Machines (SVMs) and/or Linear Discriminant Functions, can be constructed. The classifier can include, for example, a hierarchical classifier which can order or otherwise arrange the set of features of the replacement part into in predetermined classes or hierarchy. The set of features of the replacement parts can include information on shape, texture, color, material, thread count, a html link to at least one supplier, information on usability, and/or image (e.g., a thumbnail image). In some embodiments, the replacement parts can also be classified into hierarchical classifiers based on type in the database. For example, the replacement parts can be classified into a first-level classification as a fastener, or another part. If the replacement part is a fastener, a second-level classification can be performed to classify the replacement part as a fastener with a head, or a round a fastener. If the replacement part is a fastener with a head, a third-level classification can be performed to classify the replacement part as a screw, a bolt, or a rivet. Alternatively, if the replacement part is a round fastener, the third-level classification can classify the replacement part as a nut or a washer. Further classifications can also be performed based on the set of features of the replacement parts. Classifying the replacement parts can facilitate identification of one or more replacement parts having a set of features similar to the set of the features of the test part using hierarchical comparison, as described herein.

The computing device 130 is configured to receive the sequence of images of the test part 110 from the imaging device 120. The computing device 130 can receive the sequence of images from the imaging device 120 using any suitable means, for example, a hard wired connection, BLUETOOTH®, low power BLUETOOTH®, Wi-Fi, via a local area network (LAN), a wide area network (WAN), or the internet.

The computing device 130 can include algorithms or otherwise set of instructions operable to extract the set of features of the test part from the sequence of images of the test part. The instructions can be stored on a non-transitory computer-readable medium such as, for example, a magnetic hard drive, a solid-state drive, a CD ROM, a DVD ROM, or the likes. The set of features can include a dimension, shape, texture, color, thread count, spectral characteristic, and/or a histogram threshold of the test part. For example, in some embodiments, the algorithm or otherwise set of instructions can include a Hough Transform (e.g., circular Hough Transform, Kernel-based Hough Transform), any other suitable image processing technique, or a combination thereof. In some embodiments, the algorithms or otherwise set of instructions can be operable to use a reference object (e.g., a penny) included in the sequence of images to determine dimensions, shape, texture, color, or any other feature of the test part 110, as described herein.

In some embodiments, the test part 110 can be a screw, a nut, or a bolt. In such embodiments, the set of features extracted by the computing module 130 can include a dimension (e.g., length, diameter of head, diameter of body, etc.), a shape (e.g., round, hexagonal, etc.), a material (e.g., aluminum, copper, brass, stainless steel, etc.) and a thread count of the test part 110.

The computing device 130 is configured to compare the set of features of the test part 110 with the database of the set of features of each of the plurality of replacement parts. In some embodiments, the computing device 130 can be configured to compare the set of features of the test part 110 with the database of the set of features of the replacement parts using hierarchical comparison. In such embodiments, the set of features of the test part 110 can also be arranged by the computing device 130 in a predetermined hierarchy, similar to the hierarchical classification of the replacement parts. For example, a first-level hierarchical classification can determine whether the test part 110 is a fastener, or some other part. If the test part 110 is a fastener, a second-level classification can determine if the test part 110 is a fastener with a head or a round fastener. Furthermore, a third-level classification can determine if the test part 110 is a screw, a bolt or a rivet (if the second-level classification determined the test part 110 to be a fastener with a head), or the test part 110, is a nut or a washer (if the second-level classification determined the test part 110 to be a round fastener). Further sub-level classifications can include, shape of head, length, color, material, thread count, texture, and so on. In this manner, the computing device 130 can be configured to hierarchically compare the set of features of the test part 110 with the set of features of the replacement parts which can be already classified using a similar hierarchy in the database, as described herein.

In some embodiments, once the first-level, second-level, and/or third level hierarchical classifications are performed, comparison of the set of features of the extracted from the test part 110 do not have to be compared with the set of features of the replacement part to obtain a match. Furthermore, new replacement parts added to the database may not have to be trained to database (i.e., hierarchical classification performed on new part) if it belongs to any one of the classifications already determined by the system 100. In this manner, the hierarchical classification can decrease the comparison time by rapidly excluding parts that do not fall within the hierarchical classifications identified for the test part 110. Furthermore, extensive training or extraction of a set of features of a new replacement part might not have to be performed if it already belongs to any one of the hierarchical classifications already defined by the system 100. This is particularly helpful when parts are scraped from suppliers' websites which only provide textual information on a replacement part's properties but do not include an image of the replacement part.

The computing device 130 identifies at least one replacement part in the database having a set of features similar to the set of features of the test part 110. In some embodiments, the computing device 130 can be configured to use heuristics to determine one or more replacement parts that have a set of features best matching the set of features of the test part 110. In some embodiments, the dimensions of the test part 110 and the replacement parts can be in units that do not match. For example, the computing device 130 can extract dimension of the test part 110 in SI units, while the dimensions of the replacement part are in inches. In such embodiments, the computing device 130 can be configured to use a standard deviation to determine the closest match taking into account any error associated with computer vision metrology.

The computing device 130 can filter all identified replacement parts based on priority. For example, any duplicate replacement parts identified in the database can be filtered such that only one replacement part from each supplier is included. Expanding further, to filter the identified replacement parts based on priority, the computing device 130 can determine if more than one supplier of an identified replacement part is found. The computing device 130 can then select only a priority supplier of the identified replacement part to be included in a priority list, as described herein, and remove the rest of the suppliers from the priority list. The priority supplier can include, for example, a supplier which is contractually obligated, provides lowest rates, is reputable, and/or is located in a geographically preferred location.

The computing device 130 develops the priority list of the identified replacement parts. In some embodiments, the computing device 130 can develop the priority list by sorting the identified replacement parts to include identified replacement parts that have a set of features that best match the set of features of the test part 110, to be arranged on top of the priority list. For example, certain features included in the set of features of the replacement part can be more relevant or pertinent in finding a replacement part for the test part 110. For example, the thread counts, length, and width of a test part that includes a screw (also referred to as "the test screw") can have higher priority relative to the size or shape of the head of the screw. Thus, replacement screws having thread counts, length, and/or width similar to the test screw will have higher priority over replacement screws that have a similar head to the test screw.

The priority list can then be communicated to a user. For example, the computing device 130 can include a display (e.g., a monitor, a smartphone screen, or a tablet screen) configured to display the priority list of the replacement parts to the users. In some embodiments, the computing module 130 can be configured to display only the top one, two, or three replacement parts that were the closest match to the test part 110 to the user. In such embodiments, the computing device 130 can provide the user with an interface, for example, a check box, pull down menu, or button to allow the user to view the other replacement parts included in the priority list.

In some embodiments, no replacement part can be identified in the database having a set of features similar to the test part 110, by the computing module 130. In such embodiments, the set of features of the test part 110 can be added to the database. Moreover, in some embodiments, the computing module 130 can allow the user to manually enter information corresponding to the test part 110 in the database, for example, set of features, supplier information, etc. In some embodiments, the computing module 130 can determine that the set of features of the identified replacement part stored in the database are less than the set of features of the test part. In such embodiments, the remaining set of features of the test part can also be added to the database.

Figure 2:
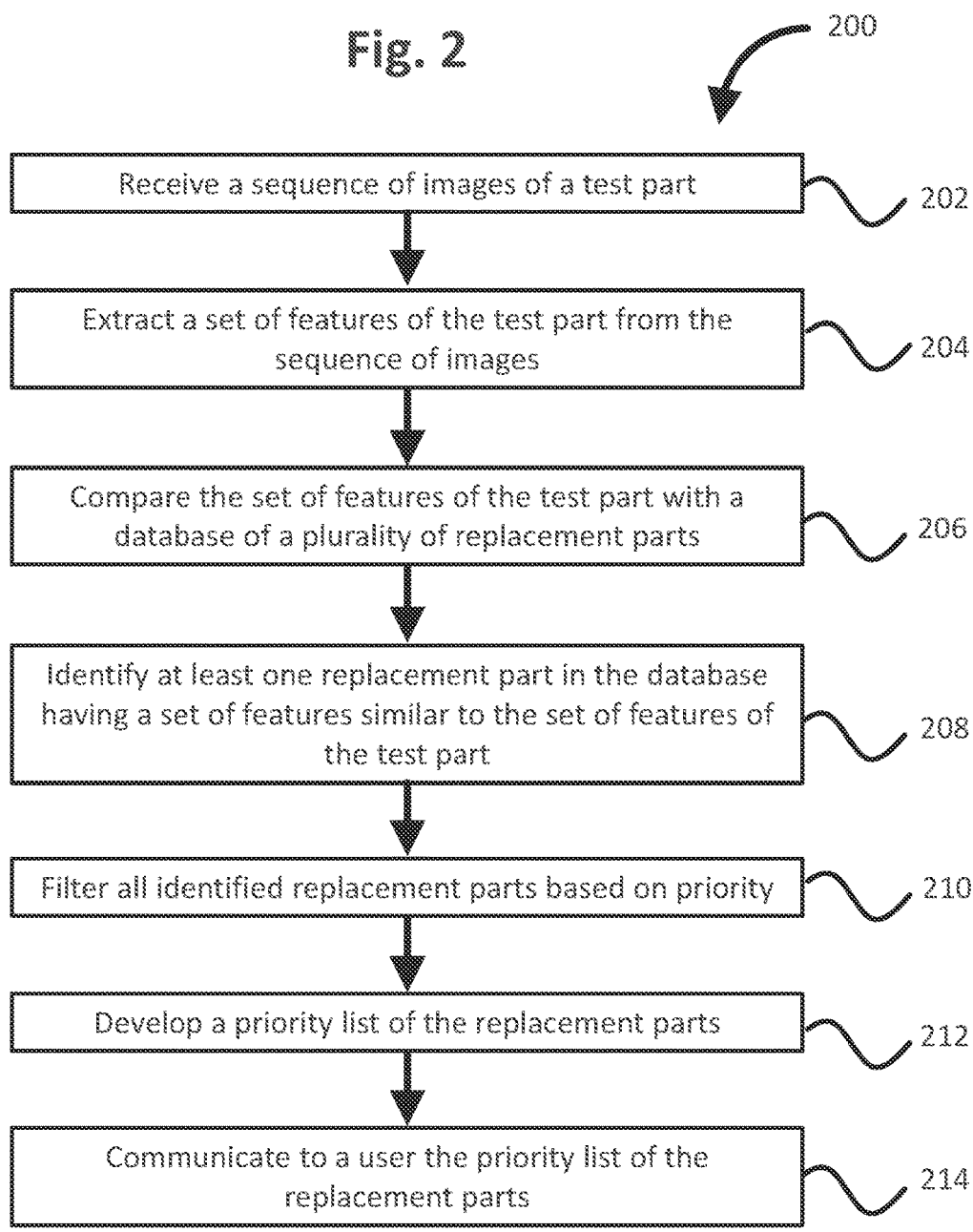
FIG. 2 is a schematic flow diagram of an exemplary method for extracting features of a test part via a sequence of images and identifying replacement parts, according to an embodiment.

FIG. 2 shows a schematic flow diagram of an exemplary method 200 for identifying a replacement part. The method 200 can be used with any system described herein, for example, the system 100, or, a non-transitory computer readable medium capable of being executing by a computing device, for example, the computing device 130, or 430. The method 200 includes receiving a sequence of images of a test part, at 202. The test part can include a screw, a bolt, a rivet, a nut, a washer, or any other test part, as described herein with respect to the test part 110. The sequence of images can be captured using any image capture device, for example, a smart phone, a tablet, a camera, or any other image capture device as described with respect to the imaging device 120 included in the system 100. The sequence of images can include a plurality of images captured from different angles to show different views of the test part. In some embodiments, the sequence of images can include a video of the test part, for example, a 3-dimensional video, or a video captured from different angles.

A set of features of the test part are extracted from the sequence of images, at 204. The set of features can include a dimension, a shape, a texture, a color, a material, a thread count, a spectral characteristic, a histogram threshold, scale invariant features (e.g., Scale Invariant Feature Transform (SIFT), Speed-up-Robust Feature (SURF), etc.), and/or keypoint features (e.g., Binary Robust Invariant Scalable Keypoints (BRISK), Fast Retina Keypoint (FREAK), Binary Robust Independent Elementary Features (BRIEF), Oriented Fast, and Rotated BRIEF (ORB), etc.). In some embodiments, in which the test part is a screw, a nut, or a bolt, the extracted set of features can at least include a dimension, a shape, a material, and a thread count of the test part. In some embodiments, the sequence of images can include an object having a known shape, dimension, color, and texture (e.g., a penny). The object can serve as a reference object for extracting the set of features of the test part.

The set of features of the test part can extracted using a computing device, for example, the computing device 130 included in the system 100, or any other computing device described herein (e.g., the computing device 430 described herein). For examples instructions can be stored on a non-transitory computer readable medium which can be executed by a computing device (e.g., the computing device 130, or 430, as described herein) for extracting the set of features of the test part. For example, the set of features of the test part can extracted using a Hough Transform. Furthermore, any number of instructions can be stored on the non-transitory computer readable medium described herein, for performing any of the operations described herein.

The set of features of the test part are compared with a database of a plurality of replacement parts, at 206. The database stores a set of features of the replacement parts. In some embodiments, the method 200 can also include populating the database of the plurality of replacement parts. The database can be populated by crawling a plurality of websites of suppliers of one or more of the replacement parts, and scraping information corresponding to the set of features of one or more of the replacement parts from each of the plurality of websites. In some embodiments, the set of features of the replacement parts included in the database can include a shape, a texture, a color, a material, a thread count, a html link to at least one supplier, information on usability, and an image (e.g., a thumbnail image).

The method 200 identifies at least one replacement part in the database having a set of features similar to the set of features of the test part, at 208. For example, heuristics can be used to determine one or more replacement parts that have a set of features best matching the set of features of the test part. In some embodiments, the dimensions of the test part and the replacement parts can be in units that do not match. For example, the computing device 130 can extract dimension of the test part in SI units, while the dimensions of the replacement part are in inches or vice versa. In such embodiments, the computing device can be configured to use a standard deviation to determine the closest match taking into account any error associated with computer vision metrology. If no replacement is discovered in the database, the set of features of the test part can be added to the database. In some embodiments, the set of features of the identified replacement part stored in the database can be less than the set of features of the test part. In such embodiments, the remaining features of the test part can be added to the database.

All identified parts are filtered based on priority, at 210. This can include, for example, determining if more than one supplier of an identified replacement part is found, and selecting only a priority supplier of the identified replacement part to include in a priority list, as described herein.

A priority list of replacement parts is developed, at 212. This can include, for example, sorting the identified replacement parts to include replacement parts having a set of features that best match the set of features of the test part to be arranged on top of the priority list. For example, certain features included in the set of features of the replacement part can be more relevant or pertinent in finding a replacement for the test part. For example, the thread counts, length, and width of a test part that includes a screw (also referred to as "the test screw") can have higher priority relative to the size or shape of the head of the test screw. Thus, replacement screws having thread counts, length, and/or width similar to the test screw will have higher priority over replacement screws that have a similar head to the test screw.

The priority list of the replacement parts is communicated to a user, at 214. For example, the priority list of the replacement parts can be communicated to the user on a display (e.g., a monitor, a smartphone screen, or a tablet screen). In some embodiments, the top one, two, or three replacement parts that were the closest match to the test part to the user can be displayed to the user. In such embodiments, the display can include an interface, for example, a check box, pull down menu, or button to allow the user to view the other replacement parts included in the priority list.

Figure 3:
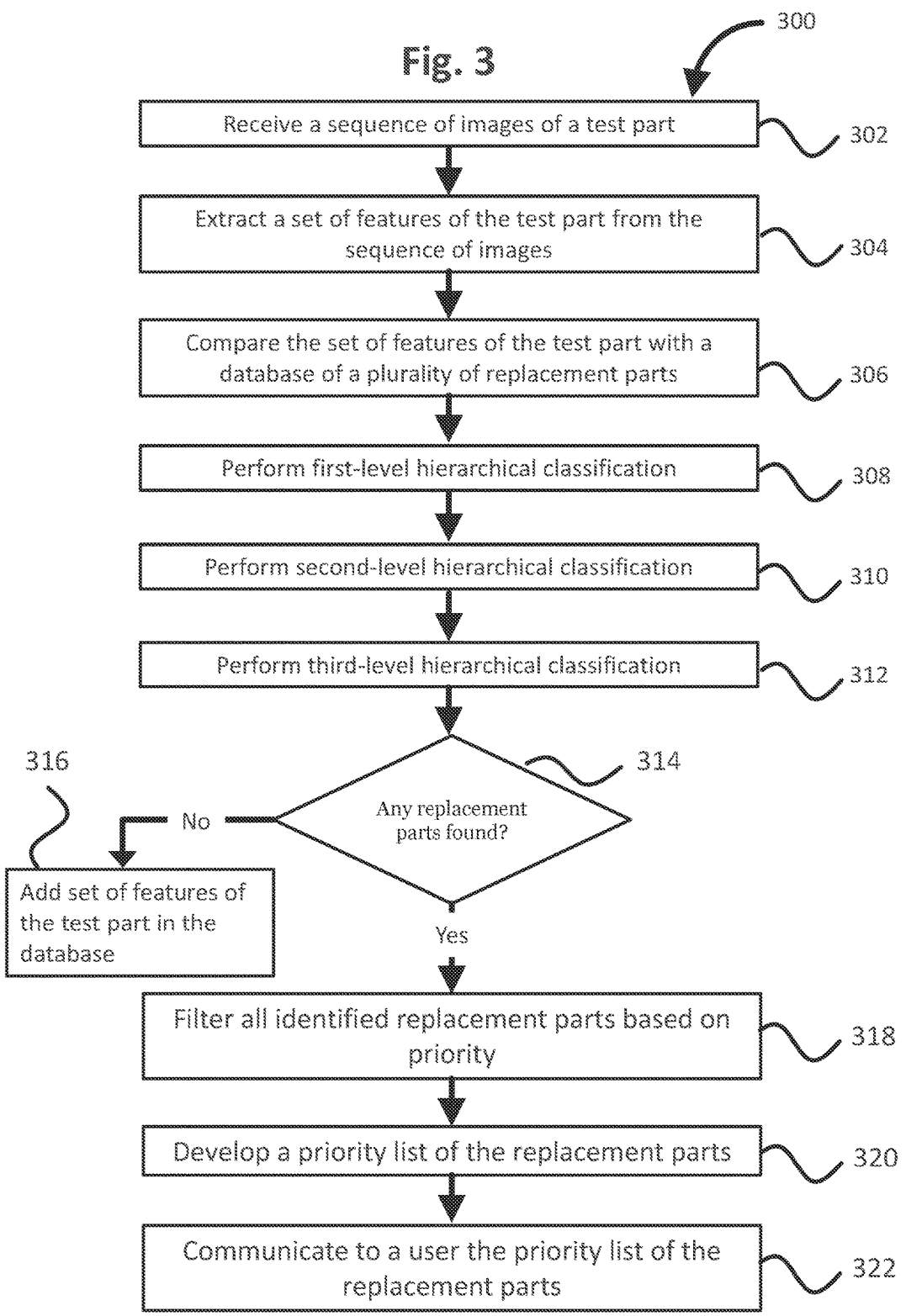
FIG. 3 is a schematic flow diagram of an exemplary method for extracting features of a test part via a sequence of images and identifying replacement parts using hierarchical comparison, according to an embodiment.

In some embodiments, a method for identifying replacement parts for a test part can include hierarchical comparison of a set of features of a test part. FIG. 3 is a schematic flow diagram of an exemplary method 300 for identifying a replacement part. The method 300 can be used with any system described herein, for example, the system 100, or a non-transitory computer readable medium capable of being executing by a computing device, for example, the computing device 130, or 430 described herein.

The method 300 includes receiving a sequence of images of a test part, at 302. The test part can include a screw, a bolt, a rivet, a nut, a washer, or any other test part, as described herein with respect to the system 100. The sequence of images can be captured using any image capture device, for example, a smart phone, a tablet, a camera, or any other image capture device, as described herein with respect to the imaging device 120 included in the system 100. The sequence of images can include a plurality of images captured from different angles to show different views of the test part. For example, the test part can be a screw and the sequence of images can include a side view of the screw showing the thread count and length of the screw, a front head view showing the type of head of the screw, and/or a bottom view showing the tip of the screw as well as the radius. In some embodiments, the sequence of images can include a video of the test part, for example, a 3-dimensional video, or a video captured from different angles.

The set of features of the test part are extracted from the sequence of images, at 304. The set of features can include a dimension, a shape, a texture, a color, a material, a thread count, a spectral characteristic, a histogram threshold, scale invariant features (e.g., Scale Invariant Feature Transform (SIFT), Speed-up-Robust Feature (SURF), etc.), keypoint features (e.g., Binary Robust Invariant Scalable Keypoints (BRISK), Fast Retina Keypoint (FREAK), Binary Robust Independent Elementary Features (BRIEF), Oriented Fast, and Rotated BRIEF (ORB), etc.), and/or any other physical or computational feature relevant to identification of the test part. In some embodiments, the test part can include a screw, a bolt, or a nut. In such embodiments, the extracted features can at least include a dimension, a shape, a material, and a thread count of the test part. In some embodiments, the sequence of images of the test part can also include an object having a known shape, dimension, color, and texture (e.g., a penny). The object can serve as a reference for extracting the set of features of the test part.

The set of features of the test part can be extracted using a computing device, for example, the computing device 130 included in the system 100, the computing device 430, or any other computing device described herein. For example, instructions can be stored on a non-transitory computer readable medium which can be executed by a computing device (e.g., the computing device 130 or 430) for extracting the set of features of the test part. In some embodiments, the set of features can be extracted using a Hough Transform. Furthermore, any number of instructions can be stored on the non-transitory computer readable medium described herein for performing any of the operations described herein.

The set of features of the test part are compared with a database of a plurality of replacement parts, at 306. The database can, for example, be stored on a computer readable medium. The database stores a set of features of the plurality of replacement parts. In some embodiments, the database can be populated by crawling a plurality of websites of suppliers of one or more of the replacement parts and scraping information corresponding to the set of features of one or more of the replacement parts from each of the plurality of websites. In some embodiments, the set of features of the replacement parts included in the database can include a shape, a texture, a color, a material, a thread count, a html link to at least one supplier, information on usability, and an image (e.g., a thumbnail image).

In some embodiments, models of the replacement parts can be trained using images of replacement parts and/or super vector features, which can be Gaussian Mixture Models (GMMs), Convolutional Neural Networks (CNNs), Radial Basis Functions (RBFs), and/or other kernels and a classifier, such as Support Vector Machines (SVMs) and/or Linear Discriminant Functions, can be constructed. The classifier can include, for example, a hierarchical classifier which can order or otherwise arrange the set of features of the replacement part into in predetermined classes or hierarchy. The set of features of the replacement parts can include information on shape, texture, color, material, thread count, a html link to at least one supplier, information on usability, and/or image (e.g., a thumbnail image). In some embodiments, the replacement parts can also be classified into hierarchical classifiers based on type in the database.

For example, the replacement parts can be classified into a first-level hierarchical classification as a fastener, or another part. If the replacement part is a fastener, a second-level hierarchical classification can be performed to classify the replacement part as a fastener with a head, or a round fastener. If the replacement part is a fastener with a head, a third-level hierarchical classification can be performed to classify the replacement part as a screw, a bolt, or a rivet. Alternatively, if the replacement part is a round fastener, the third-level classification can classify the replacement part as a nut or a washer. Further classifications can also be performed based on the set of features of the replacement parts. Classifying the replacement parts can facilitate identification of one or more replacement parts having a set of features similar to the set of the features of the test part using hierarchical comparison, as described herein.

A first-level hierarchical classification is performed, at 308. For example, the first-level hierarchical classification can determine if the test part is a fastener, or any other part. The fastener can include a fastener with a head (e.g., a screw, a bolt, or a rivet), or a round fastener (e.g., a nut or a washer).

A second-level hierarchical classification is performed, at 310. For example, if the first-level classification determined that the test part is a fastener, the second-level hierarchical classification can determine if the test part is a fastener with a head, or a round fastener. Expanding further, the test part can be a screw and the second-level classification can determine that the test part is a fastener with a head. Alternatively, the test part can be a nut, and the second level classification can determine that the test part is a round fastener.

A third-level hierarchical classification is performed, at 312. For example, the third-level hierarchical classification can determine a sub-type of the test part. Expanding further, the third-level classification can determine whether the test part is a screw, a bolt or a rivet, if the second-level classifier determined the test part to be fastener with a head. Similarly, the third-level classification can determine whether the test part is a nut or a washer, if the second-level classifier determined the test part to be a round fastener.

While not shown, further sub-level classifications can also be performed. For example, a sub-level classification can classify the replacement test part based on the set of features of the test part. For example, the test part can be a screw and a first sub-level classification can determine the material of the screw, a second sub-level classification can determine the thread count of the screw, a third sub-level classification can determine the color of the screw, and so on, not necessarily in that order.

The method determines if any replacement part is found, at 314. Expanding further, the method 300 determines if there are one or more replacement parts in the database that include a set of features which are similar to the set of features of the test part. If no replacement part having a set of features similar to the set of features of the test part is found in the database, the set of features of the test part are added to the database, at 316. In this way, the database can continue evolving to include any new replacement parts not already included in the database. In some instances, replacement parts can be found that have of set of features that are less than the set of features of the test part. In another words, the number of features of the replacement parts included in the set of features of the replacement part is less than the number of the set of features of the test part. In such instances, the remaining set of features of the test part can also be added to the database.

If one or more replacement parts are identified in the database that have a set of features similar to the set of features of the test part, than all identified replacement parts are filtered based on priority, at 318. In some embodiments, the filtering based on priority can include determining if more than one supplier of an identified replacement part is found, and selecting only a priority supplier of the identified replacement part to include in a priority list, as described herein.

A priority list of replacement parts is developed, at 320. This can include, for example, sorting the identified replacement parts to include replacement parts having a set of features that best match the set of features of the test part to be arranged on top of the priority list. For example, certain features included in the set of features of the replacement part can be more relevant or pertinent in finding a replacement for the test part. For example, the thread counts, length, and width of a test part that includes a screw (also referred to as "the test screw") can have higher priority relative to the size or shape of the head of the test screw. Thus, replacement screws having thread counts, length, and/or width similar to the test screw will have higher priority over replacement screws that have a similar head to the test screw.

The priority list of replacement parts is communicated to a user, at 322. For example, the priority list of the identified replacement parts can be displayed to the user on a display (e.g., a monitor, a smartphone, or a tablet display). In some embodiments, only a subset of the identified replacement parts can be displayed to the user, for example, the top three identified replacement parts. In such embodiments, a drop down menu or any other option can be provided to the user to view all other identified replacement parts that are not initially displayed to the user. In addition, the user can provide an indication that a replacement part was indeed a correct replacement part. This indication can be integrated into the database and used in selecting replacement parts for future searches.

Figure 4:
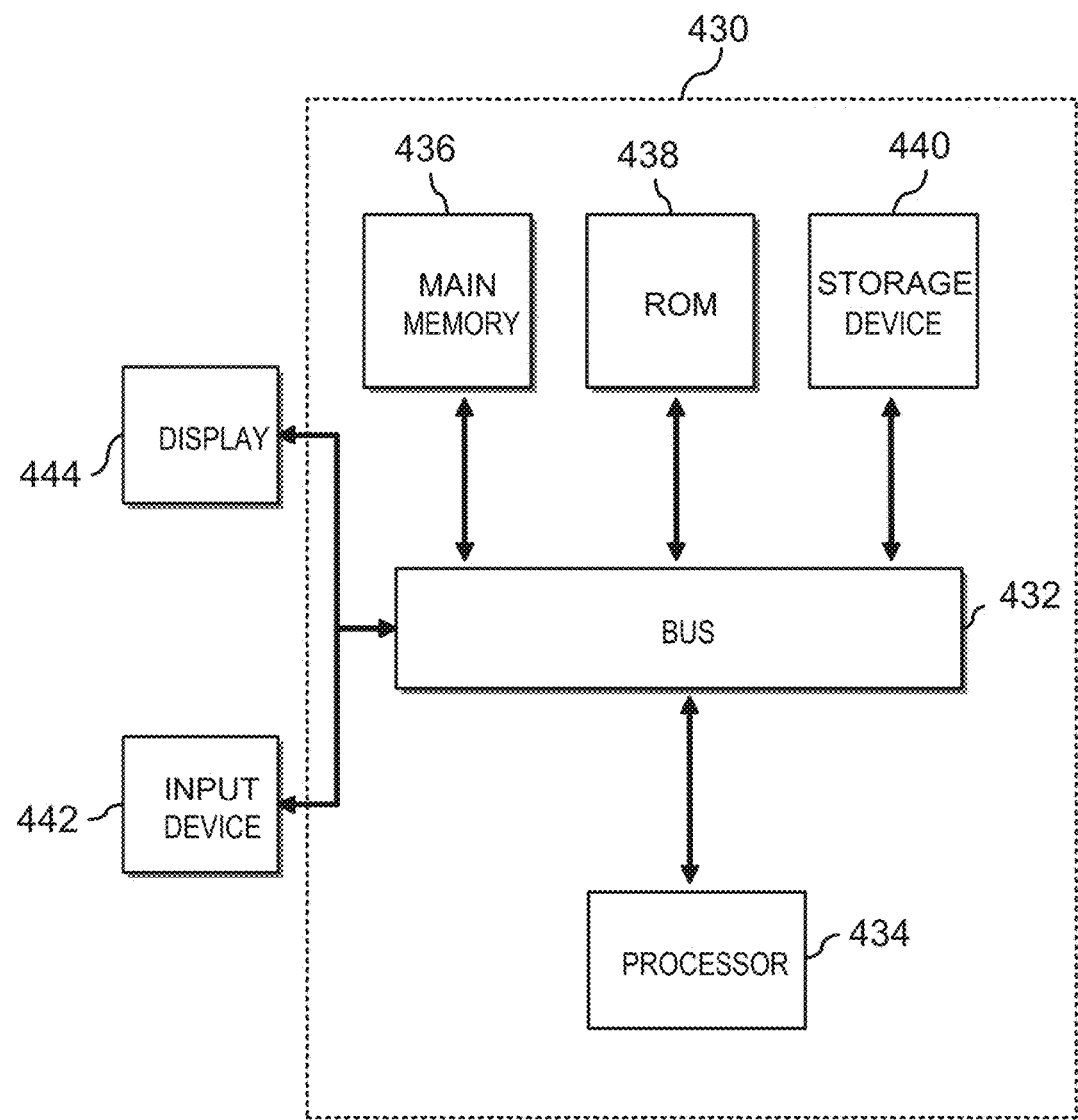
FIG. 4 is a block diagram of a computing device in accordance with an embodiment.

FIG. 4 is a block diagram of a computing device 430 in accordance with an illustrative implementation. The computing device 430 includes a bus 432 or other communication component for communicating information and a processor 434 or processing circuit coupled to the bus 432 for processing information. The computing device 430 can also include one or more processors 434 or processing circuits coupled to the bus for processing information. The computing device 430 also includes main memory 436, such as a random access memory (RAM) or other dynamic storage device, coupled to the bus 432 for storing information, and instructions to be executed by the processor 434. Main memory 436 can also be used for storing position information, temporary variables, or other intermediate information during execution of instructions by the processor 434. The computing device 430 may further include a read only memory (ROM) 438 or other static storage device coupled to the bus 432 for storing static information and instructions for the processor 434. A storage device 440, such as a solid-state device, magnetic disk or optical disk, is coupled to the bus 440 for persistently storing information and instructions.

The computing device 430 may be coupled via the bus 432 to a display 635, such as a liquid crystal display, or active matrix display, for displaying information to a user. An input device 442, such as a keyboard including alphanumeric and other keys, may be coupled to the bus 432 for communicating information and command selections to the processor 434. In another implementation, the input device 442 has a touch screen display 444. The input device 442 can include a cursor control, such as a mouse, a trackball, or cursor direction keys, for communicating direction information and command selections to the processor 434 and for controlling cursor movement on the display 444.

According to various implementations, the processes and methods described herein can be implemented by the computing device 430 in response to the processor 434 executing an arrangement of instructions contained in main memory 436. Such instructions can be read into main memory 436 from another non-transitory computer-readable medium, such as the storage device 440. Execution of the arrangement of instructions contained in main memory 436 causes the computing device 430 to perform the illustrative processes described herein. One or more processors in a multi-processing arrangement may also be employed to execute the instructions contained in main memory 436. In alternative implementations, hard-wired circuitry may be used in place of or in combination with software instructions to effect illustrative implementations. Thus, implementations are not limited to any specific combination of hardware circuitry and software.

Although an example computing device has been described in FIG. 4, implementations described in this specification can be implemented in other types of digital electronic circuitry, or in computer software, firmware, or hardware, including the structures disclosed in this specification and their structural equivalents, or in combinations of one or more of them.

Figure 5A:
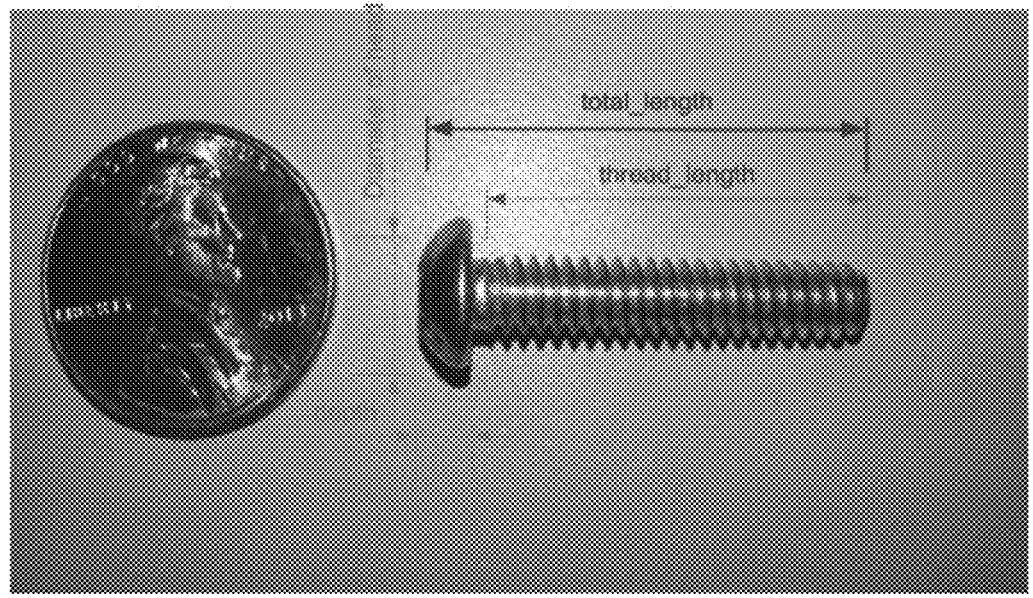
FIG. 5A shows a first image of a blunt head screw captured from the side to show the thread count and including a penny in the image as a reference object for extracting the set of features of the screw.
Figure 5B:
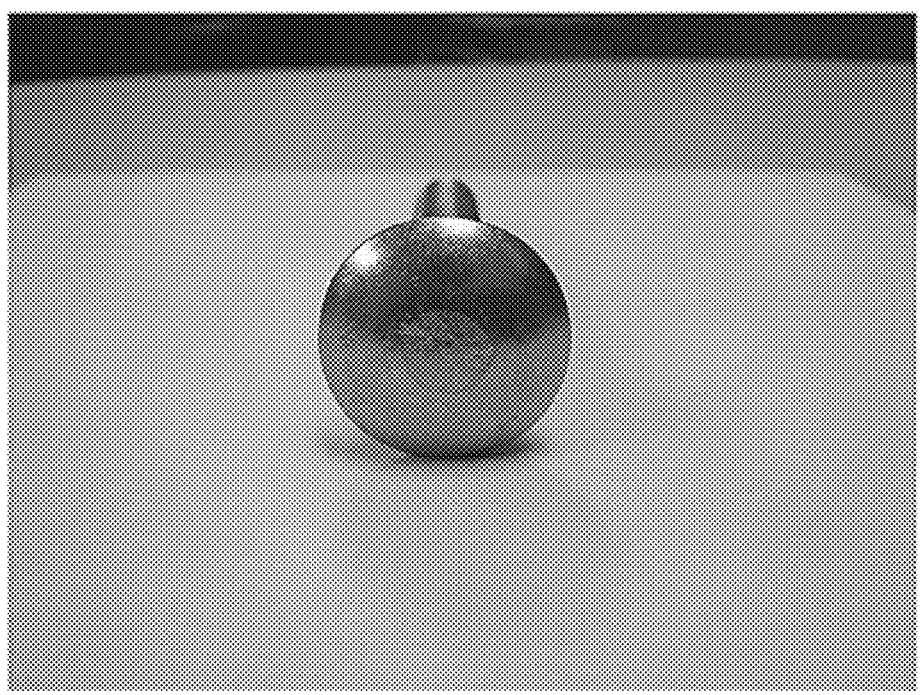
FIG. 5B shows a second image of the blunt head screw of FIG. 5A captured from the front to show the head of the screw, which can be used to determine the head type of the screw.

FIGS. 5A and 5B are exemplary images of a test part which includes a blunt head screw. The images can be used to extract the set of features of the screw using any embodiments of the system and methods described herein, for example, the system 100, or the methods 200, or 300. Expanding further, FIG. 5A is a first image of a screw taken from the side (i.e., a top-down aerial view) to show the thread count, thread length, total length, diameter of head, and depth of the head of the screw. A penny is also included in the first image as a reference object. In some embodiments, a circle Hough Transform is performed on the penny to extract the set of features of the penny for use as reference features for the screw. A first-level hierarchical classification is performed on the first image to determine if the test part (i.e., the blunt head screw) is: (1) a part with a head (i.e., a screw or a bolt); (2) a round part (i.e., a washer, a nut, etc.), or; (3) any other object.

Based on the first-level classification, the system or method can determine that the test part is a part with a head. Furthermore, the system or method can also determine the diameter of the head of the screw, the total length of the screw, the depth of the screw, the length of the threaded portion of the screw, and the diameter of the base of the screw. A line Hough Transform can be used to determine the thread count of the screw. Preprocessing of the image can also be performed on the image to obtain before extracting the set of features. Such preprocessing can include, for example, converting the image from color into a binary image (e.g., black and white or grayscale) which can make it easier to apply the transforms.

In some embodiments in which the test part is a washer or nut, the first-level classification can classify the test part as a round part. Furthermore, the first level classification can also determine the inner and outer diameter of the washer or nut. In such embodiments, the outer diameter can be determined using distance from one flat to the adjacent flat side, and/or distance from one corner to another corner (e.g., using the Whitworth system).

FIG. 5B is a second image of the blunt head screw captured from the front to show the head of the screw. This can be used to determine the head type of the screw. For example, in some embodiments, a second-level classification can determine if the head type of the screw is round, hex, or square. A third-level classification can determine a sub-type of the screw. For example, the third-level classification can determine if the screw is dome or flat, and if the drive type is Philips, flat, Allen, torx 6, security torx 6, etc. The third-level classification or any sub-level classification can also determine a length of the major axis of the drive of the screw. Various strategies can be used to determine the major axis of the drive of the screw. For example, for a Philips head, the drive type is a cross, so the drive type includes two major axes which are the same length. For a flat screw, the major axis is a single axis. For a torx 6 drive type which includes a symmetric star, the major axis can be from any corner to an adjacent corner. For an Allen 6 (hex socket) drive type, the hex is symmetric and the major axis can be from any corner to an adjacent corner. Similarly, for a security hex 6 drive type which also includes a symmetric star, the major axis can be from any corner to an adjacent corner. Since the test part shown in FIGS. 5A and 5B is a blunt head screw (FIG. 5B) which does not include a drive, no major axis will be extracted for the screw.

FIGS. 6-11 show an automated machine 500 for capturing images of a batch of replacement parts which can be uploaded to a computing device (e.g., the computing device 130 described herein) to extract the set of features of the batch of the replacement parts. The machine 500 includes a loading portion 502, an imaging portion 504, and a recovery portion 506. The machine 500 also includes a conveyor belt 508, a plurality of imaging devices 520a-f, and optionally, a computing device 530.

Figure 6:
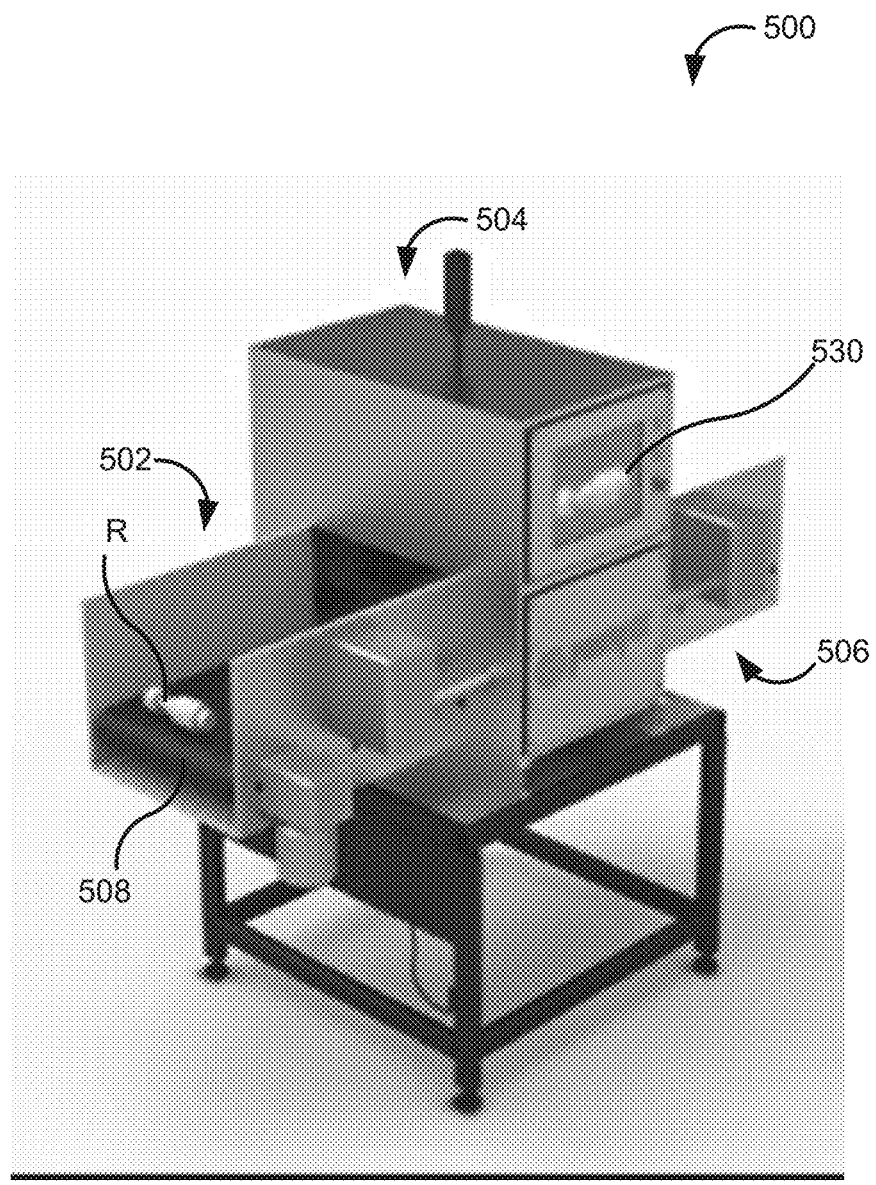
FIG. 6 is front perspective view of a machine for capturing images of a batch of replacement parts, according to an embodiment.

As shown in FIG. 6 a replacement part R included in a batch of replacement parts can be disposed on the conveyor belt 508 in the loading portion 502 of the machine 500. The conveyor belt 508 can be mounted on rollers and can be configured to move continuously through the machine 500 to carry the replacement part R from the loading portion 502, to the recovery portion 506 through the imaging portion 504. The conveyor belt 508 can be formed from a substantially transparent material such as, for example, polycarbonate, acrylic, plastic, any other suitable material or a combination thereof. This can allow viewing of the replacement part R from below.

Figure 7:
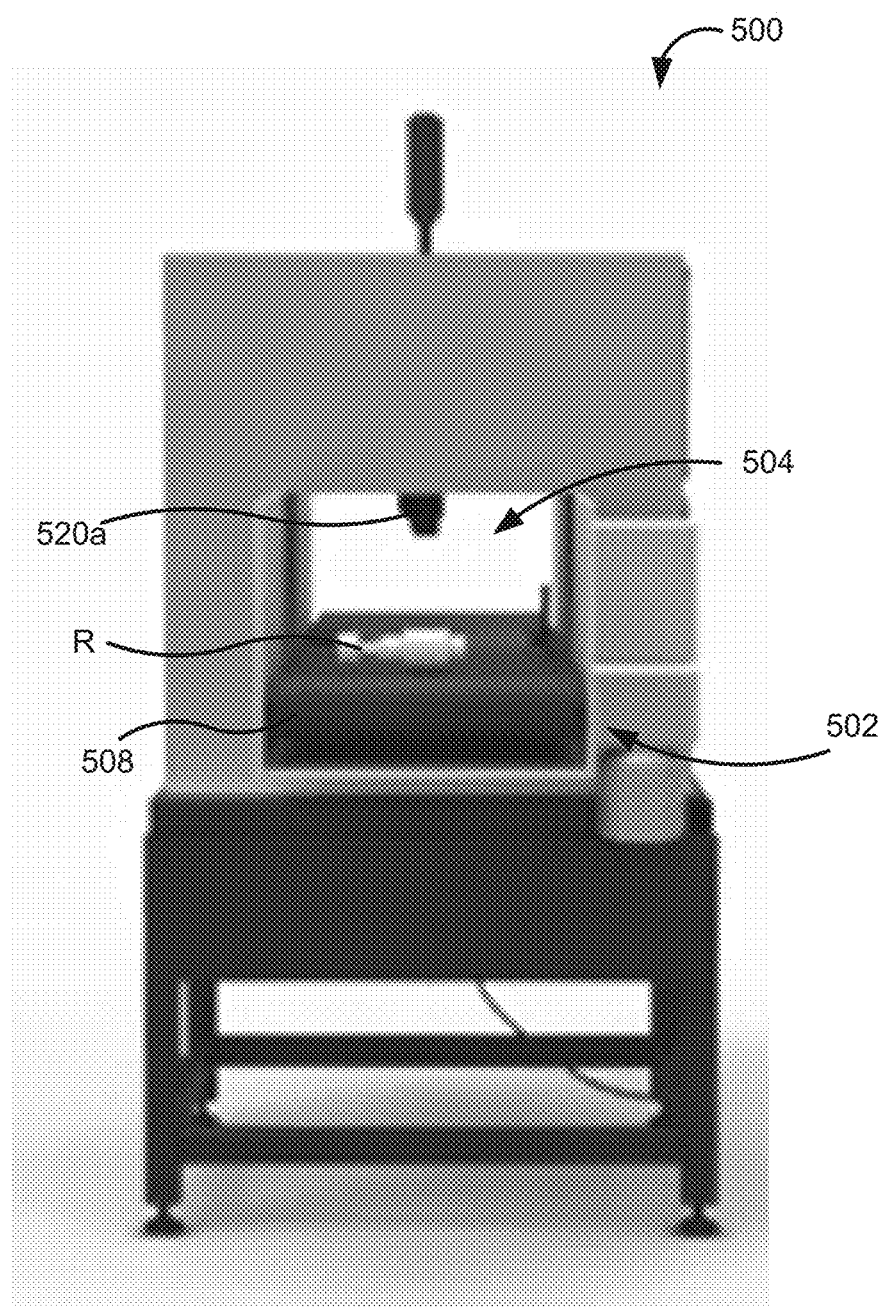
FIG. 7 is a front view of the machine of FIG. 6.
Figure 8:
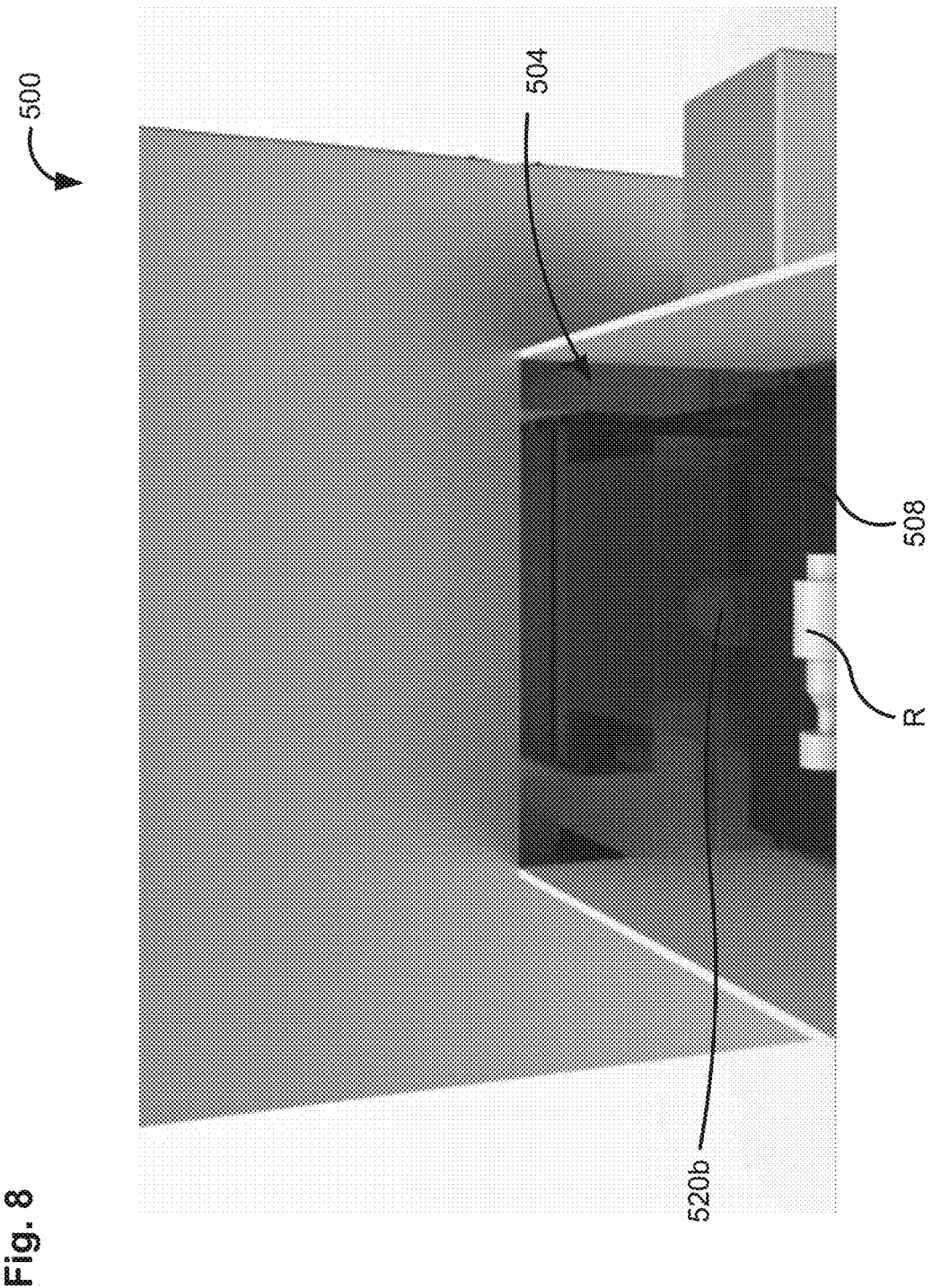
FIG. 8 is an angled front view of the machine of FIG. 6.

FIG. 7 shows the replacement part R traveling on the conveyor belt 508 into the imaging portion 504. A first imaging device 520a (e.g., a camera) is disposed and oriented in the imaging portion 504 to capture an image of the replacement part R from above the replacement part R. As shown in FIG. 8 a second imaging device 520b is disposed in the imaging portion 504 below the conveyor belt 508. The second imaging device 520b is configured to capture an image of the replacement part R from below, through the conveyor belt 508.

Figure 9:
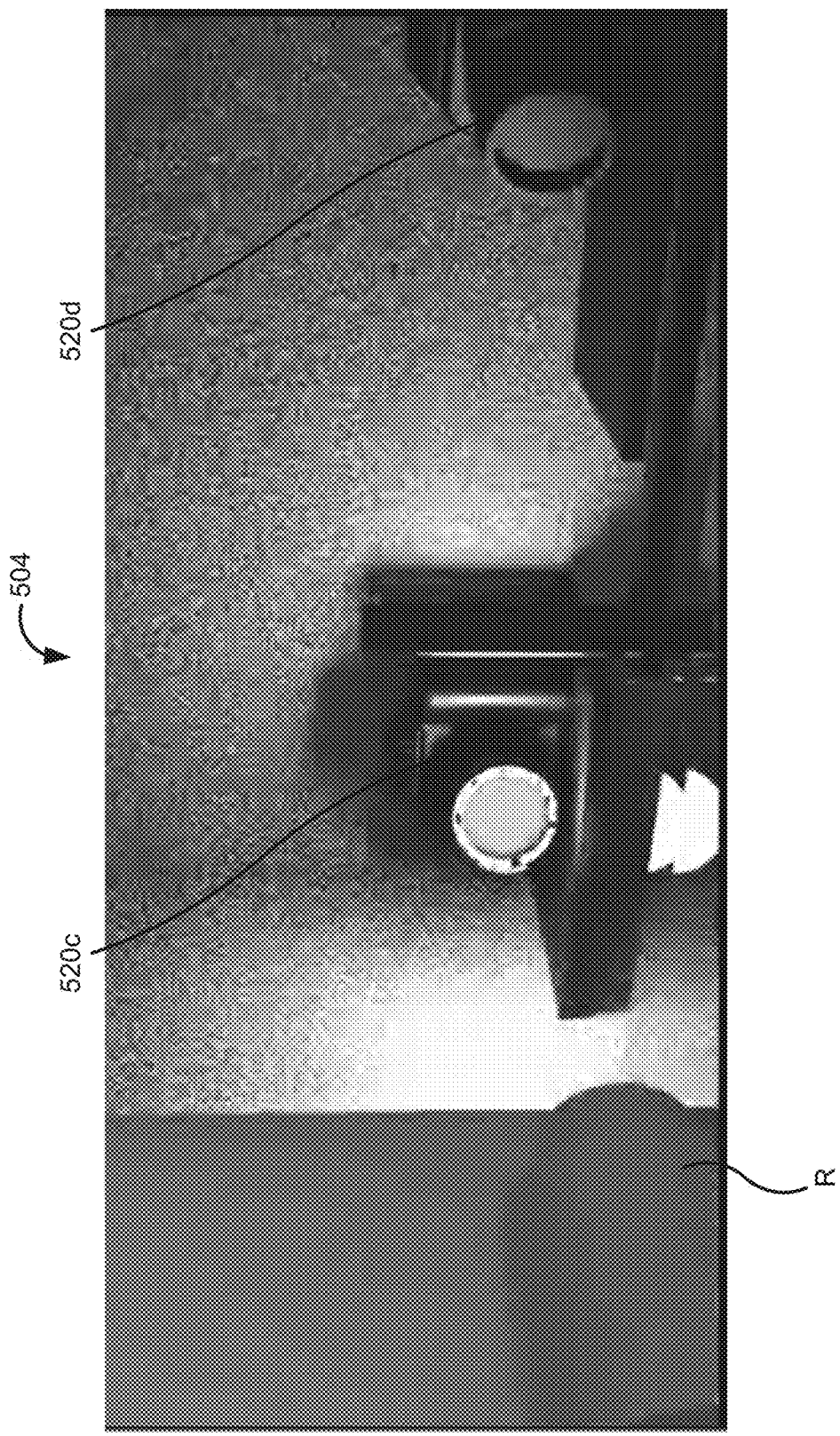
FIG. 9 is a first detailed view of the machine of FIG. 6.
Figure 10:
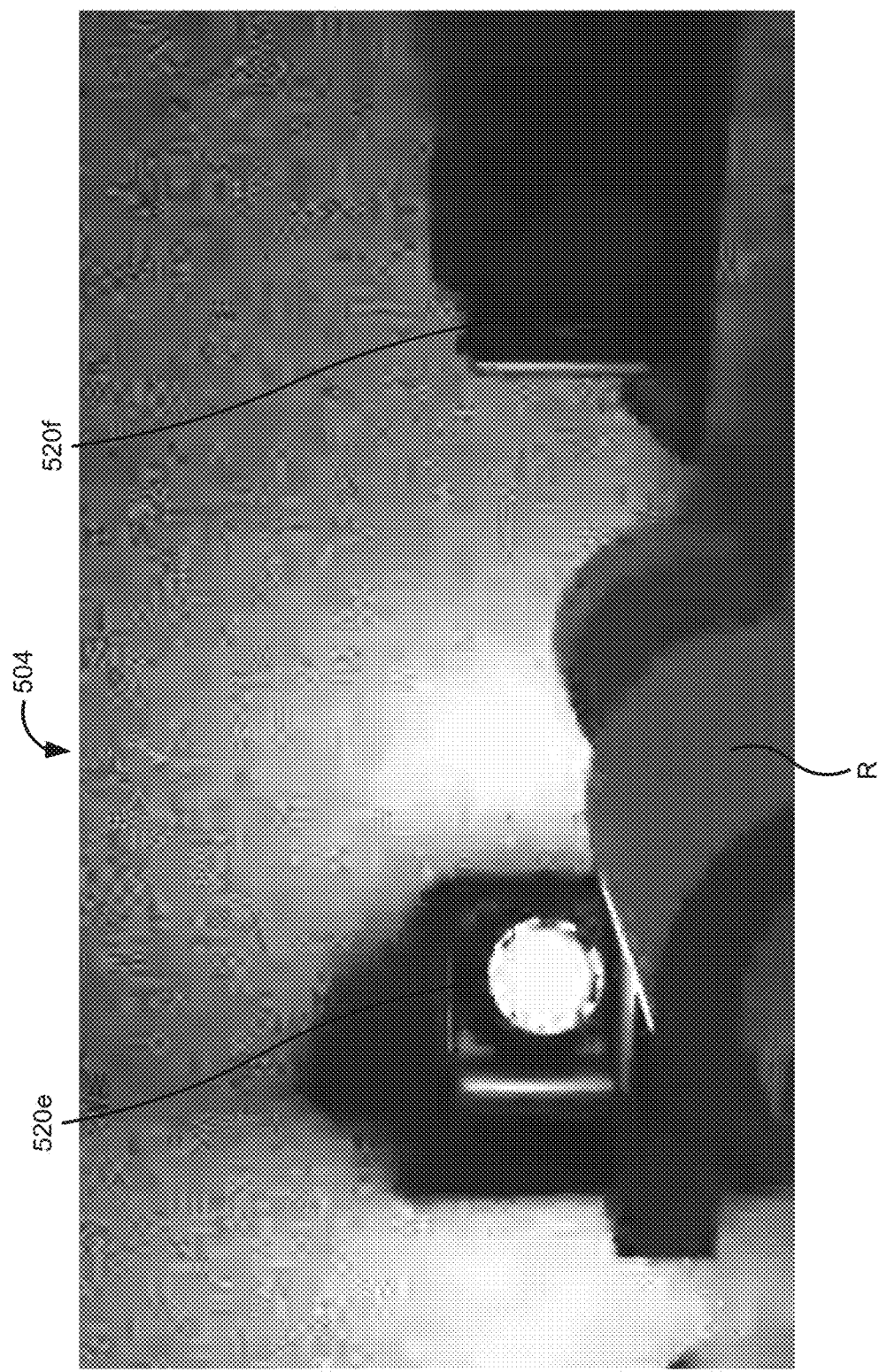
FIG. 10 is a second detailed view of the machine of FIG. 6.
Figure 11:
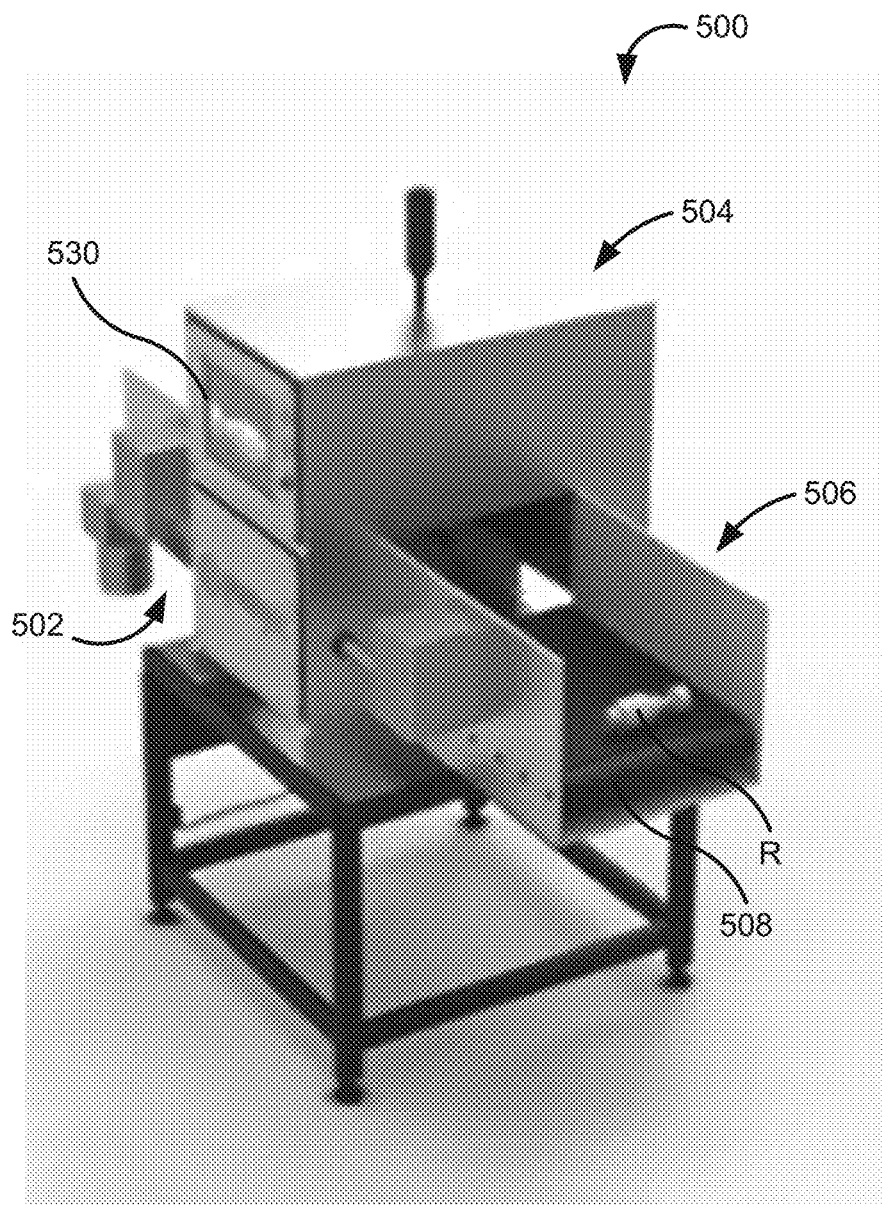
FIG. 11 is a back perspective view of the machine of FIG. 6.

FIG. 9 shows a third imaging device 520c and a fourth imaging device 520b disposed in the imaging portion 504. The third imaging device 520c and the fourth imaging device 520f are disposed and oriented to capture images of the front of the replacement part R from two different angles. Furthermore, as shown in FIG. 10 a fifth imaging device 520e and a sixth imaging device 520f are also disposed in the imaging portion 504, which are disposed and oriented to capture images of the back of the replacement part R from two different angles. In other words, each of the imaging device 520c-f can be disposed in the imaging portion 504 so as to capture images of the replacement part R from four different angles around the replacement part R. For example, the third imaging device 520c can be oriented at a 45 degree angle relative to a central axis of the replacement part R and in the same plane as the central axis. The fourth imaging device 520d can be dispose at a 135 degree angle, the fifth imaging device 520e can be disposed at a 225 degree angle, and the sixth imaging device 520f can be disposed at a 315 degree angle with respect to the central axis of the replacement part R in the same plane. In this manner, the imaging devices 520a-f in combination can capture 360 degree images of the replacement part R.

While not shown, the imaging portion 504 can also include sensors configured to detect that a replacement part R is present in the imaging portion 504, and to trigger the imaging devices 520a-f to capture images of the replacement part R. Suitable sensors can include, for example, motion sensors, weight sensors, laser sensors, infrared sensors, any suitable sensors or combination thereof. In some embodiments, the machine 500 can be configured such that each of the imaging devices 520a-f capture images of the replacement part R simultaneously. In some embodiments, the machine 500 can be configured such that the imaging device 520a-f capture images of the replacement part R sequentially. The imaging portion 504 can also include lighting to allow the images to be captured with a predetermined brightness and/or contrast.

Once the images of the replacement part R are captured, the replacement part R can continue travelling on the conveyor belt 508 through the imaging portion 504 and into the receiving portion 506 where it can be collected or otherwise removed from the conveyor belt 508. The conveyor belt 508 can be configured to run continuously such that a batch of replacement parts can be loaded on the machine 500 one after the other and the imaging devices 520a-f can continuously capture images of the replacement parts. The machine can be configured to assign ID's to each replacement part imaged such that the images can be correlated to the correct replacement part.

A computing device 530 can optionally be included in the machine 500. In some embodiments, the computing device 530 can be substantially similar to the computing device 130 described herein. The computing device 530 can be configured to receive the images of the batch of replacement parts and extract the set of features of the replacement parts included in the batch. The set of features of the batch of replacement parts can be used to build a database of replacement parts or add the set of features to a preexisting database. In some embodiments, the computing device can be a remote server disposed remotely from the machine 500. In such embodiments, the machine 500 can be configured to store and/or transfer data to the remote computing device for extracting the set of features. For example, the machine 500 can include Wi-Fi, wired internet connection (e.g., cable or DSL), BLUETOOTH®, USB 2.0, IEEE firewire, any other suitable technology for communicating the captured images to the remote computing module.

In some embodiments, the machine 500 can also include a display, for example, to view the captured images of the replacement part. In this manner, a user can determine if the captured images of the replacement part are of sufficient quality for extracting the set of features. In some embodiments, the machine 500 can also include an input, for example, a touch screen or a keyboard to control one or more parameters of the machine. For example, the input can be used to control the speed of the conveyor belt, lighting intensity, camera shutter speed, or any other parameters of the machine 500.

In some embodiments, the machine 500 can also be used to capture images of a test part. The images of the test part can then be used to extract the set of features of the test part for comparison with the database of replacement parts to identify a best match replacement part for the test part. Capturing images of the replacement parts as well as the test part using the machine 500 can ensure that a similar set of images is captured for the test part to extract its set of features, relative to the set of images used to extract the set of features of the replacement parts which are used to populate the database. This can enhance the fidelity of the replacement part identification process by reducing or otherwise eliminating any errors due to low quality images associated with human error.

FIGS. 12-18 show another embodiment of an imaging device 600 for capturing 3-dimensional images of a replacement part R. The imaging device 600 includes a base 602, an imaging assembly 610, and a holder assembly 640.

The base 602 can be substantially flat and is mounted on a frame 604. The base 602 can be formed from a strong and rigid material, for example aluminum, steel, wood, plastics, etc. In one embodiment, the base 602 has a hemispherical shape as shown in FIGS. 12-17. In other embodiments, the base 602 can have any suitable shape, for example square, rectangular, oval, polygonal, etc. The frame 604 includes a plurality of posts 605 for positioning the imaging system 600 securely on a surface such as a floor. In some embodiments, the posts 605 can be configured to adjusting a height of the base 602 or to level the base 602. For example, the posts 605 can include lead screws which can be threaded into or out of the frame 605 for adjusting a distance of an end of the posts 605 proximal to the surface, to the base 602. In other embodiments, wheels can be coupled to the frame in place of or in addition to the posts 605 so that the imaging system 600 can be transported from a first location to a second location by rolling on the wheels.

A platform 603 is coupled to the base 602 and positioned adjacent to the base 602. The platform 603 can include a substantially flat member which extends from the base 602. While shown in FIGS. 12-17 as having a triangular shape, in other embodiments the platform 603 can have any other suitable shape (e.g., square, rectangular, circular, hemispherical, oval, etc.). The holder assembly 640 is mounted on the platform 603 such that the replacement part R gripped in the holder assembly 640 is positioned in a line of sight of an imaging device 630 included in the imaging assembly 610, as described herein. In one embodiment, the platform 603 can be monolithically formed with the base 602, for example formed with the base 602 during a machining, milling, casting or molding process. In other embodiments, the platform 603 can be a separate part fixedly or removable coupled to the base 602, for example using rivets, screws, nuts, bolts, etc.

At least one storage drawer 608 can be disposed below the base 602. The storage drawer 608 can be moved (e.g., pulled) distally relative to the base 602 in the direction shown by the arrows C in FIG. 17, to access the storage drawer 608. The storage drawer 608 can be used to store spare parts or replacement parts.

Figure 15:
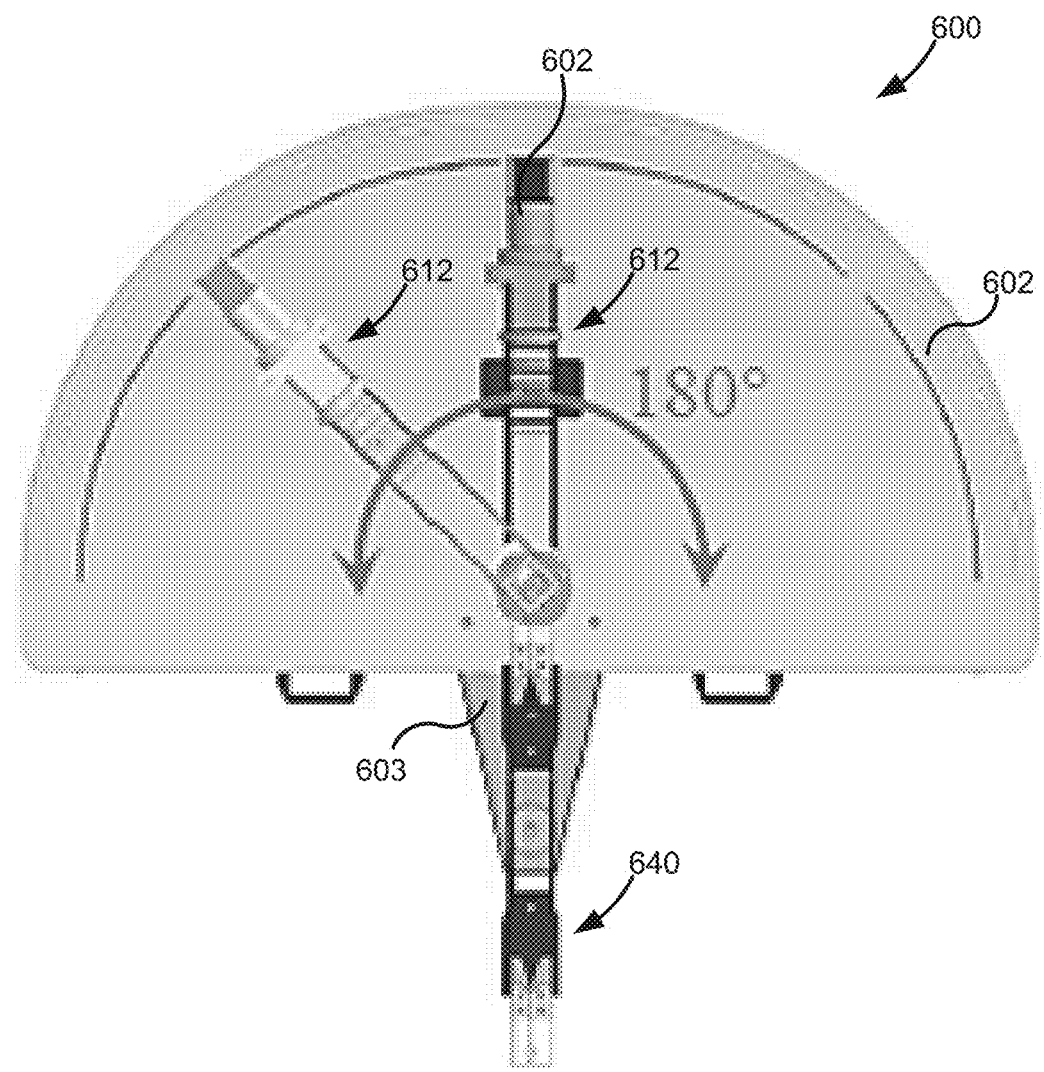
FIG. 15 is a top view of the imaging system of FIG. 12.

The imaging assembly 610 includes a first arm 612 and a second arm 622. The first arm 612 includes a first arm first portion 613 and a first arm second portion 614 distal from the first arm first portion 613. In some embodiments, the first arm 613 is pivotally mounted on the base 602 at the first arm first portion 613 on a first pivot mount 616. In such embodiments, the first arm 612 is rotatable about the first pivot mount 616 about a vertical axis $A_V$ of the imaging system 600. In some embodiments, the first arm 612 is rotatable about the first pivot mount 616 by an angle of about 180 degrees (FIG. 15). In one embodiment, the first arm 612 can be manually rotated about the first pivot mount 616. In other embodiments, an actuator, for example a servo motor can be coupled to the first pivot mount 616 for rotating the first arm 612 about the first pivot mount 616.

In other embodiments, the first arm first portion 613 can be fixedly mounted to the base 602. In such embodiments, the first arm 612 can be positioned such that the first arm second portion 614 is substantially parallel to the holder assembly 640 along a horizontal axis $A_H$ of the imaging system 600, as shown in in FIG. 13.

At least a portion of the first arm first portion 613 proximal to the first pivot mount 616 is parallel to the base 602. Furthermore, at least a portion of the first arm second portion 614 is substantially perpendicular to the base 602 and parallel to the vertical axis $A_V$ of the imaging system 600. The first arm 612 also includes a first arm third portion 615 connecting the first arm first portion 613 and the first arm second portion 614. The first arm third portion 615 defines a radius curvature of about 90 degrees such that the first arm first portion 613 is positioned proximal to the platform 603 and the first arm second portion 614 is positioned distal from the platform 603. In other words, the first arm third portion 615 extends from the first portion 613 towards an end of the base 602 distal from the holder assembly 640. Furthermore, the first arm third portion 615 curves by an angle of about 90 degrees such that the first arm second portion 614 is positioned distal to the holder assembly 640 relative to the first pivot mount 616 and the first arm first portion 613.

In other embodiments, the first arm first portion 613 can include a substantially straight member extending away from the first pivot mount 616 parallel to the base 602 distal relative to the holder assembly 640. Moreover, the second arm second portion 624 can also include a substantially straight member extending orthogonally from an end of the first arm first portion 613 distal to the base 602 and parallel to the vertical axis $A_V$ of the imaging system 600, such that the curved first arm third portion 615 is not included in the first arm 612.

The second arm 622 includes a second arm first portion 623 and a second arm second portion 624. The second arm 622 is pivotally mounted on the first arm second portion 614 at the second arm first portion 623 on a second pivot mount 626. At least a portion of the second arm first portion 623 proximal to the second pivot mount 626 is orthogonal to the base 602 and substantially parallel to the vertical axis $A_V$, and extends away from the first arm second portion 614. Furthermore, at least a portion of the second arm second portion 624 is substantially parallel to the base 602 and orthogonal to the vertical axis $A_V$ of the imaging system 600. An imaging device 630 (e.g., a charged coupled device (CCD) camera, an infrared camera or any other suitable imaging device as described herein) is mounted on the second arm second portion 624.

The second arm 624 also includes a second arm third portion 625 connecting the second arm first portion 623 and the second arm second portion 624. Similar to the first arm third portion 615, the second arm third portion 625 also defines a radius of curvature of about 90 degrees such that the second arm first portion 623 is positioned distal to the platform 603 and the second arm second portion 624 is positioned proximal to the platform along the horizontal axis $A_H$ of the system 600. In other words, the second arm third portion 625 extends from the second arm first portion 623 towards an end of the base 602 proximal to the holder assembly 640. Furthermore, the second arm third portion 625 curves by an angle of about 90 degrees such that the second arm second portion 624 is positioned proximal to the holder assembly 640 relative to the second pivot mount 626 and the second arm first portion 623.

In other embodiments, the second arm first portion 623 can include a substantially straight member extending away from the second pivot mount 626 orthogonal to the base 602 and distal relative to the base 602. Moreover, the second arm second portion 624 can also include a substantially straight member extending orthogonally from an end of the second arm first portion 613 distal to the base 603, and parallel to the base 602, such that the curved second arm third portion 625 is not included in the second arm 622.

The second arm 622 is rotatable about the second pivot mount 626 to rotate the imaging device 630 about an axis of the system 600 shown by the axis AA. The axis AA defines an axis of the second pivot mount 626 which is orthogonal to the vertical axis $A_V$ but in the same plane as the horizontal axis $A_H$ of the system 600. The axis AA is rotatable about the vertical axis $A_V$ via the rotation of the first arm 612 about the first pivot mount 616, for example by an angle of about 180 degrees. This allows 360 degree rotation of the second arm 622 and thereby, the imaging device 630 about the rotatable axis AA (FIG. 14) as well as 180 degree rotation of the second arm 622 and thereby, the imaging device 630 about the axis $A_V$ (FIG. 15). In this manner, the imaging device 630 can be positioned at a plurality of angles around the replacement part R to allow imaging of the replacement part R from the plurality of angles. More specifically, the imaging device 630 can be positioned at any point on a contoured plane surrounding the replacement part R which is defined by a hemispherical dome.

In some embodiments, the imaging device 630 can be moved to take images from different angles. For example, the imaging device 630 can be moved to take pictures at a 5 degree offset on a particular axis. Images captured from smaller offsets, e.g., less than 10 degrees, can be used to help identify images of replacement part that have a small degree of error. For example, a picture take from the top of the replacement part may be off by a small offset, e.g., less than 10 degrees. The additional images of the replacement part that also include small offsets can be used to help identify the replacement part per the methods described above.

Figure 13:
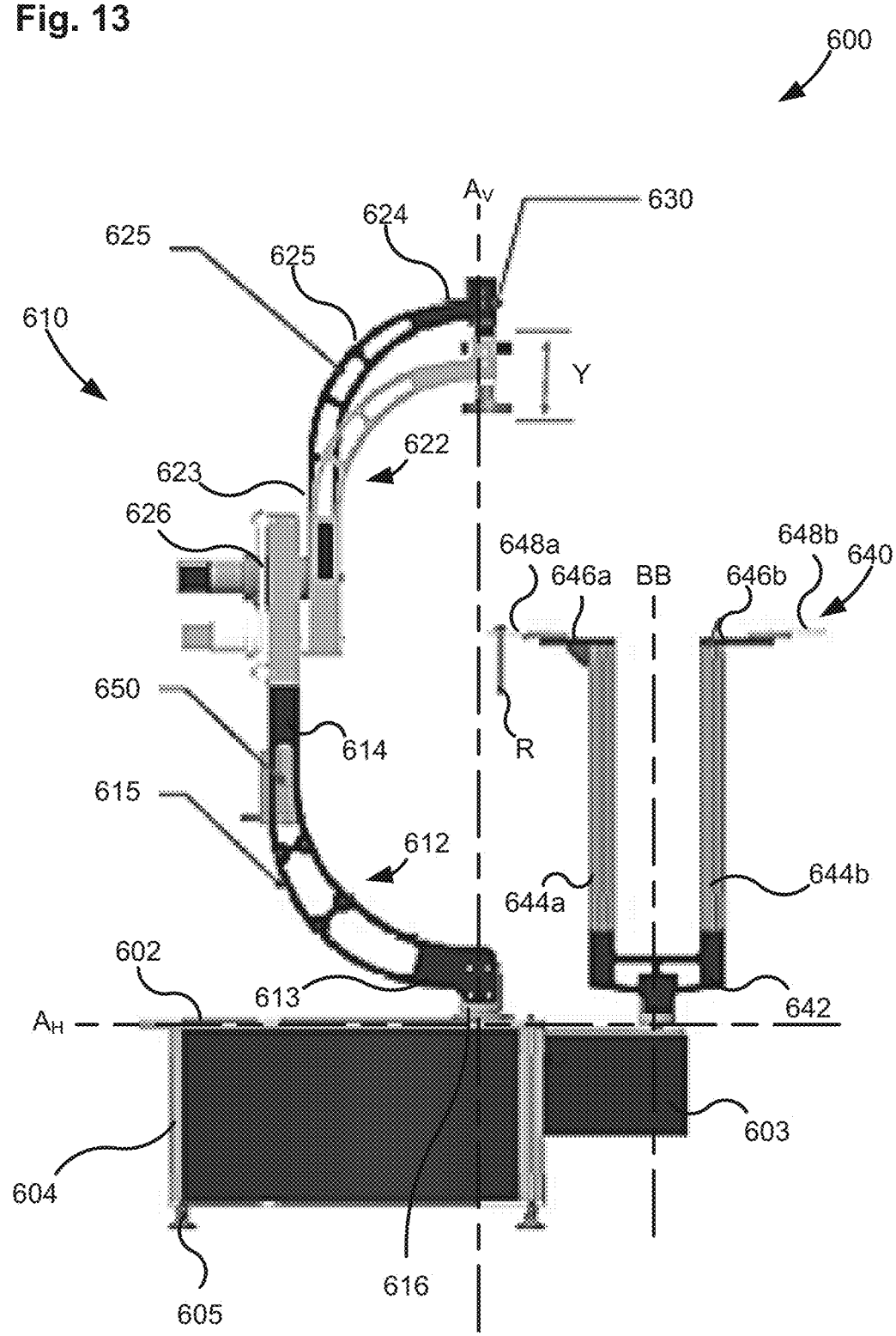
FIG. 13 is a side view of the imaging system of FIG. 12.
Figure 14:
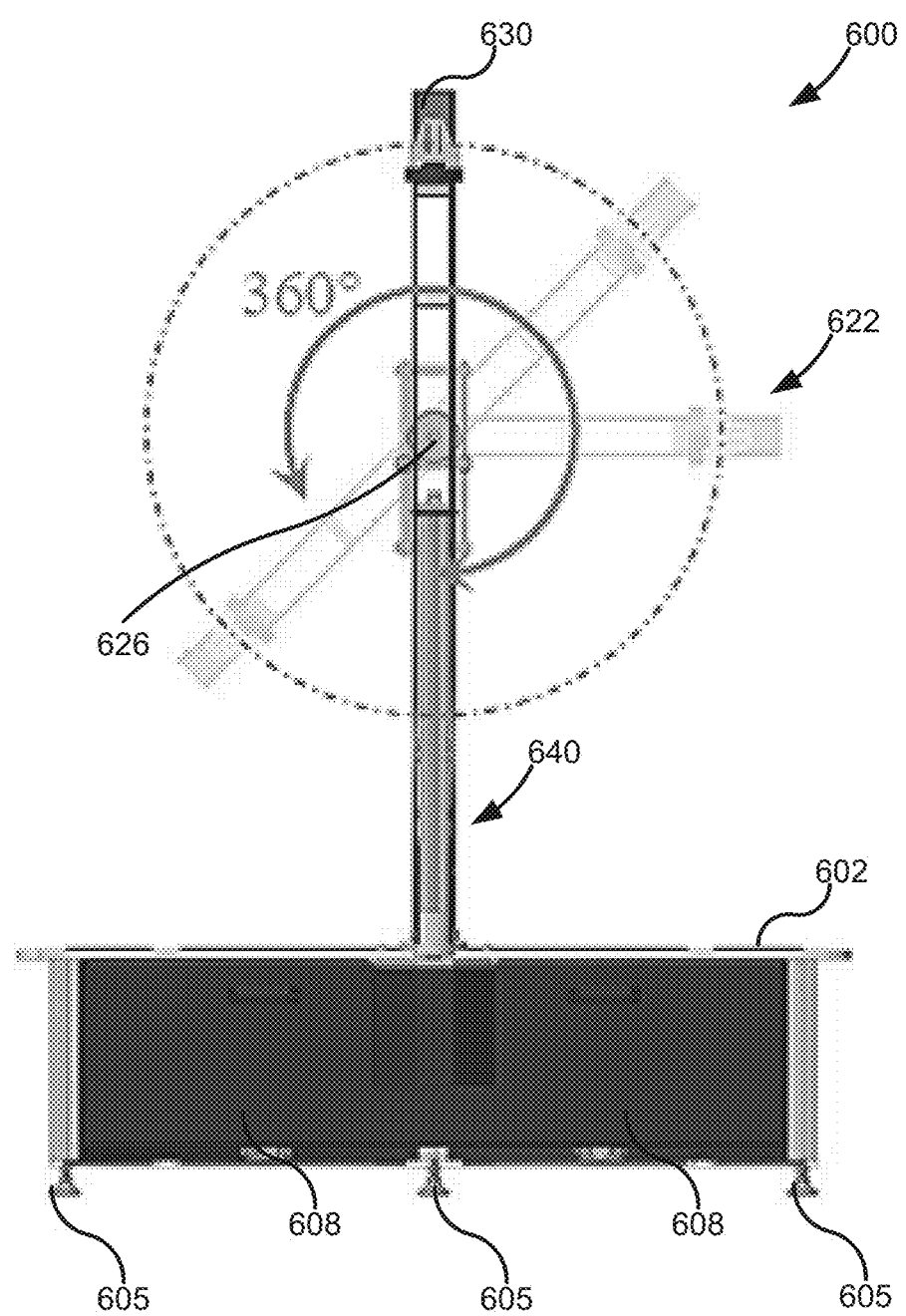
FIG. 14 is a front view of the imaging system of FIG. 12.

In some embodiments, a first actuator 650 is coupled to the second arm 622. The first actuator 650 can include a linear actuator configured to displace the second arm 622 proximally or distally relative to the replacement part R mounted on the holder assembly 640, as described herein. For example, as shown in FIG. 13, the second arm 622 is disposed to position the imaging device 630 distal to the base 602 and in line with the vertical axis $A_V$ of the system 600. The first actuator 650 moves the second arm 622 and thereby, the imaging device 630 proximally or distally relative to the base 602 by a predetermined distance Y. This can for example, allow focusing, capturing a zoomed in or a zoomed out image of the replacement part R. In one embodiment, the second arm 622 can be manually rotated about the second pivot mount 626. In other embodiments, a second actuator, for example a servo motor can be coupled to the second pivot mount 626 for rotating the first arm 612 about the second pivot mount 626.

The holder assembly 640 is configured to position the replacement part R in the line of sight of the imaging device 630 and further to allow rotation of the imaging device 630 about the replacement part R such that images of the replacement part R can be captured from a plurality of angles. The holder assembly 640 includes a base mount 642 mounted on the platform 603. The base mount 642 is pivotally mounted on the platform and is configured to rotate, for example by an angle of 360 degrees on the platform about a second vertical axis BB defined by the base mount 642. The second vertical axis is parallel to the vertical axis $A_V$ of the system 600.

The base mount 642 has a first end and a second end opposite the first end. A first strut 644a is coupled to the first end of the base mount 642, and a second strut 644b is coupled to a second end of the base mount 642. The first strut 644a and the second strut 644b extend parallel to the vertical axis $A_V$ of the system 600 and also parallel to the second vertical axis BB. The first strut 644a and the second strut 644b can include bars or rods formed from a rigid material, for example, plastics.

In some embodiments, the image system 600 includes multiple image devices (not shown). For example, the image system 600 can include the image device 630 and one or more other images devices. In one embodiment, the image system 600 can include an image device one either the first arm or the second arm such that the image device's line of sight is parallel to the horizontal axis $A_H$ of the imaging system 600. The imaging system 600 can also include an imaging device positioned on the first arm such that the image device's line of sight is at a 45 degree angle from the horizontal axis $A_H$ of the imaging system 600. Use of additional image devices allow for multiple images to be captured at the same time, reducing the amount of movement of the first arm and the second arm needed to capture all required images.

A first stage 646a is coupled to the first strut 644a and a second strut 646b is coupled to the second strut 644b. A first gripper 648a and a second gripper 648b are coupled to the first stage 646a and the second stage 646b, respectively. In one embodiment, the grippers are made of a clear or translucent material, allowing the imaging device to take a picture of the replacement part without or minimizing the interference from the gripper. The first stage 646a and the second stage 646b can include flat members configured to provide a flat and stable surface to dispose the grippers thereon. The first stage 646a and the second stage 646b can provide coupling means for coupling the grippers to the stages. For example, the first stage 646a and the second stage 646b can define threaded openings (e.g., to allow coupling of the grippers via screws, nuts, bolts, etc.), a clip, a jaw, a snap-fit mechanism, or any other coupling mechanism for fixedly or removably coupling the grippers to the stages. In some embodiments, the first gripper 648a and the second griper 648b can be coupled directly to the first strut 644a and the second strut 644b such that the first stage 646a and the second stage 646b are not included in the holder assembly 600.

Figure 12:
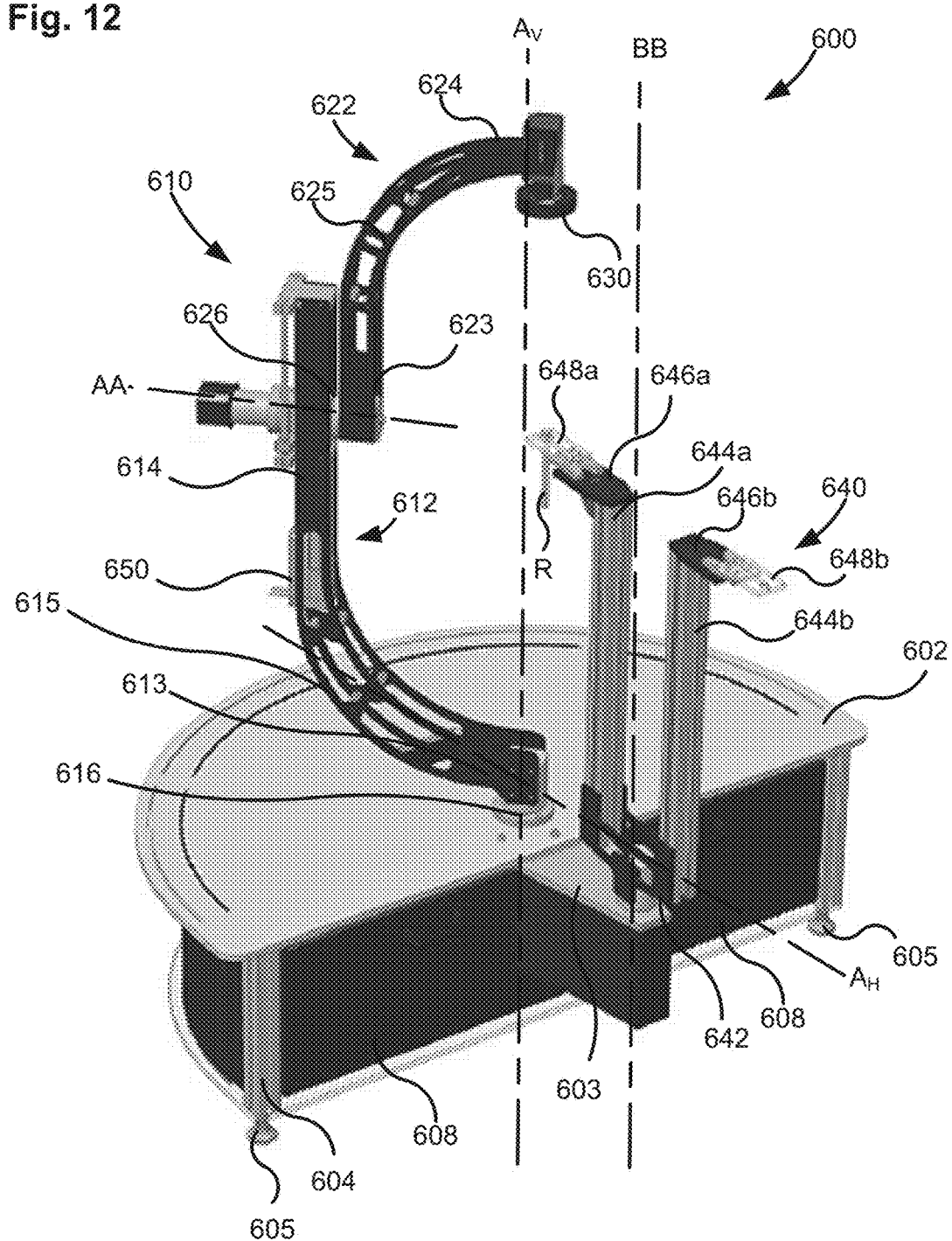
FIG. 12 is a perspective view of an imaging system according to an embodiment.

Each of the first stage 646a and the second stage 646b are positioned orthogonal to the first strut 644a and the second strut 644b. The first stage 646a extends parallel to the base 602 in a first direction and the second stage 646b extends parallel to the base 602 in a second direction opposite the first direction, as seen in FIG. 12. The base mount 642 can be rotated to position at least one of the struts, for example the first strut 644a proximal to the base 602. For example, in a first configuration, the first stage 646a is parallel to the horizontal axis $A_H$ of the system 600 and orthogonal to the vertical axis $A_V$ of the system 600. At least a portion of the first gripper 648a is disposed over the base 602 such that the replacement part R gripped by the first gripper 648 is also disposed over the base 602 and in the line of sight of the imaging device 630. The imaging device 620 can be positioned at various positions around the replacement part R in the first configuration, as described before, to capture images of the replacement part R from a plurality of angles.

Figure 16:
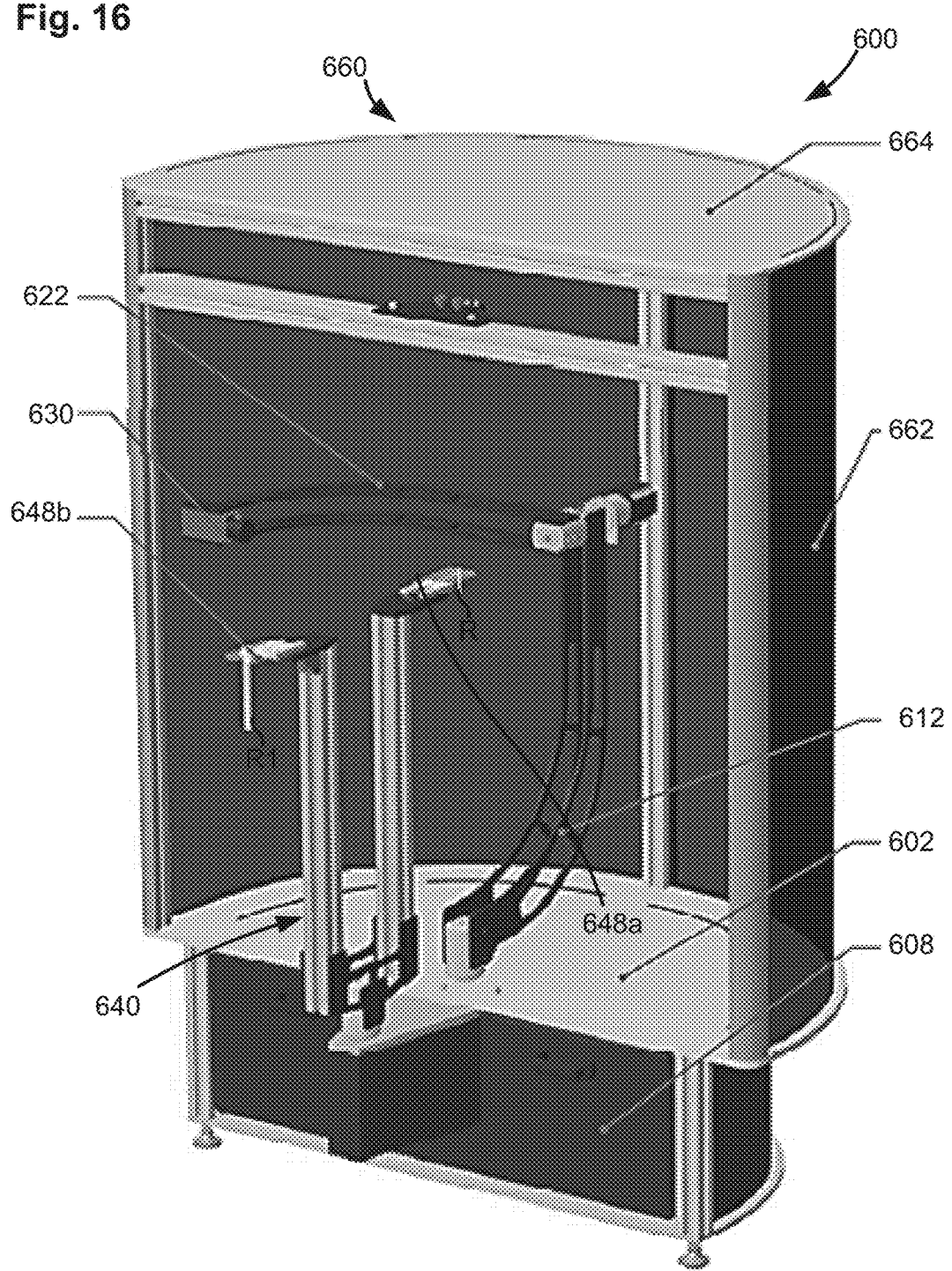
FIG. 16 is another perspective view of the imaging system of FIG. 12 with an enclosure disposed on a base of the imaging system, according to one embodiment.
Figure 17:
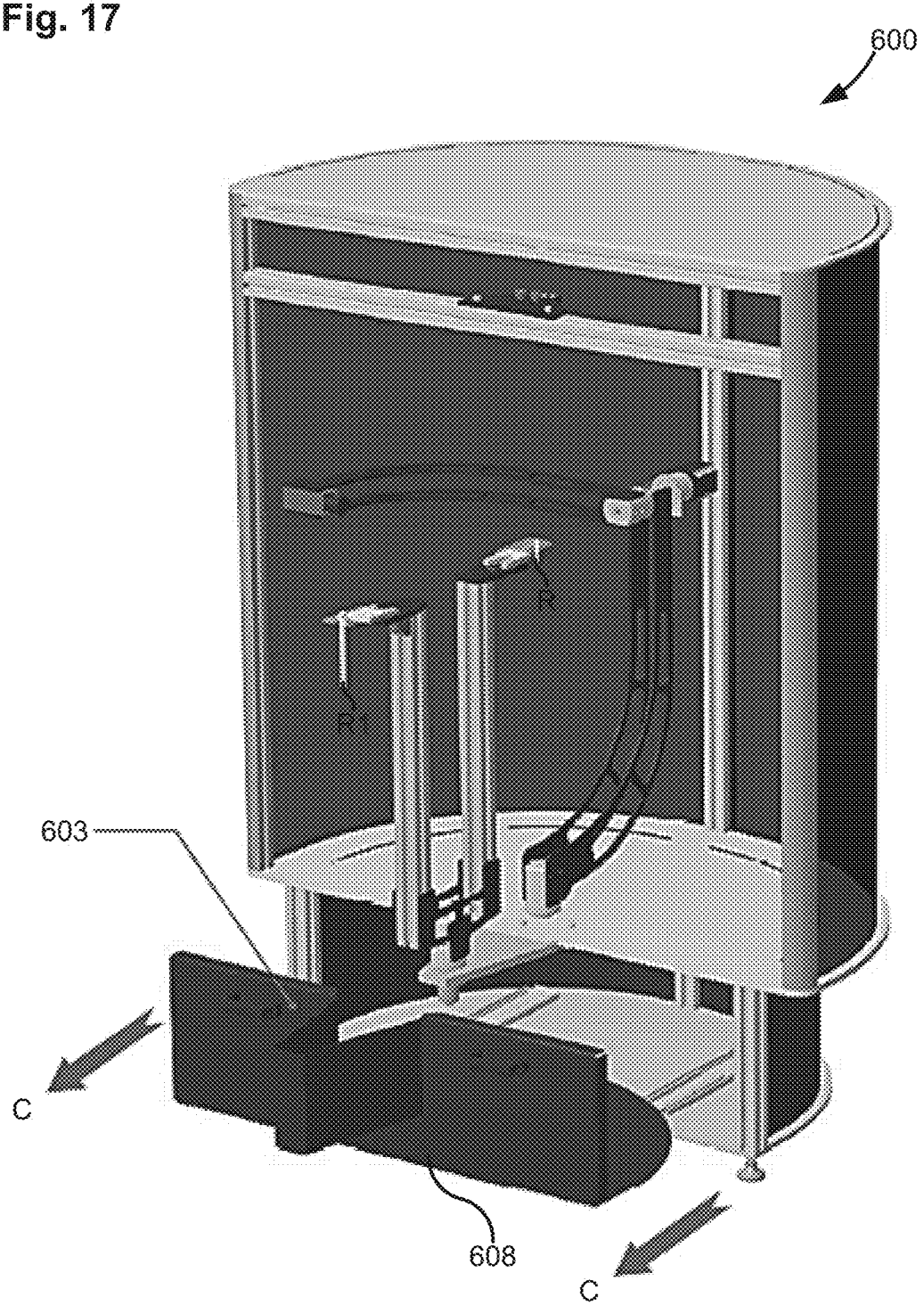
FIG. 17 is yet another perspective view of the imaging system of FIG. 16 with a storage drawer disposed beneath the base of the imaging system pulled distal from the base in a direction shown by the arrow C to reveal the storage space within the drawers.

Furthermore, the second stage 646b is also parallel to the horizontal axis $A_H$ and orthogonal to the vertical axis $A_V$, but extends away from the base 602 in the first configuration. A second replacement part R1 can be disposed in the second gripper 648b, for example as shown in FIGS. 16 and 17. Once the replacement part R is imaged, the holder assembly 640 can be moved into a second configuration. In one embodiment, an actuator can be used to signal that the image system 600 should begin capturing images of the second replacement part R1. In the second configuration, the base mount 642 can be rotated about the axis BB until the second gripper 648b is positioned over the base 602 to position the second replacement part R1 in the line of the sight of the imaging device 630. The imaging device 630 can now be used to capture images of the second replacement part R1 from a plurality of angles as described before. The replacement part R which has already been imaged can now be removed from the first gripper 648a and a third replacement part can be disposed in the first gripper 648a. In this manner, plurality of replacement parts can be imaged by the imaging system 600 by moving the holder assembly between the first configuration and the second configuration.

In some embodiments, the holder assembly can include only one strut, for example the first strut 648a mounted on the base mount 642. In such embodiments, the replacement part R can be mounted on the first gripper 648a and the base mount 642 rotated to dispose the first gripper 648a over the base 602 such that the replacement part R can be imaged as described before. After imaging, the base mount 642 can be rotated to move the first gripper 648a distal to the base 602 for removing the imaged replacement part R. A second replacement part can then be mounted on the first gripper 648a and the base mount 642 rotated again to position the first gripper 648a over the base and allowing imaging of the second replacement part. In a particular embodiment, the base mount 642 can include only one strut (e.g., the first strut 644a) fixedly mounted on the platform 603 such that the first gripper 648a is fixedly disposed over the base 602.

Figure 18A:
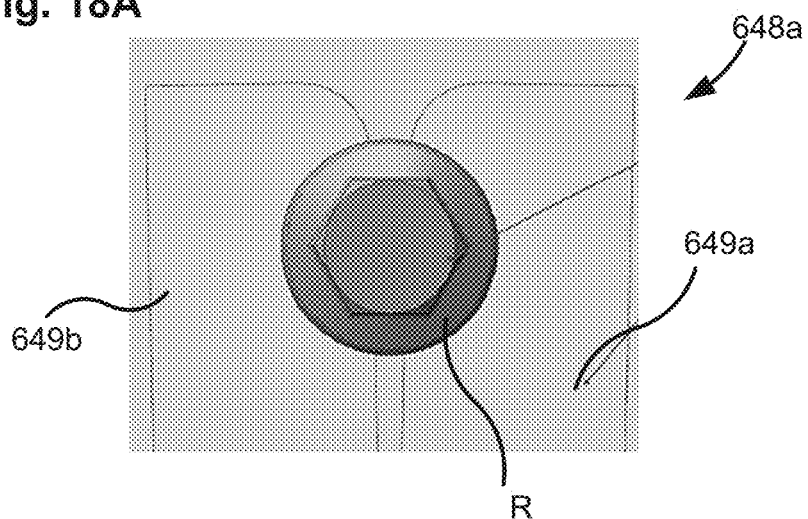
FIG. 18A shows a top view of a gripper included in the imaging system of FIG. 12 with a replacement part positioned in a slot of the gripper.
Figure 18B:
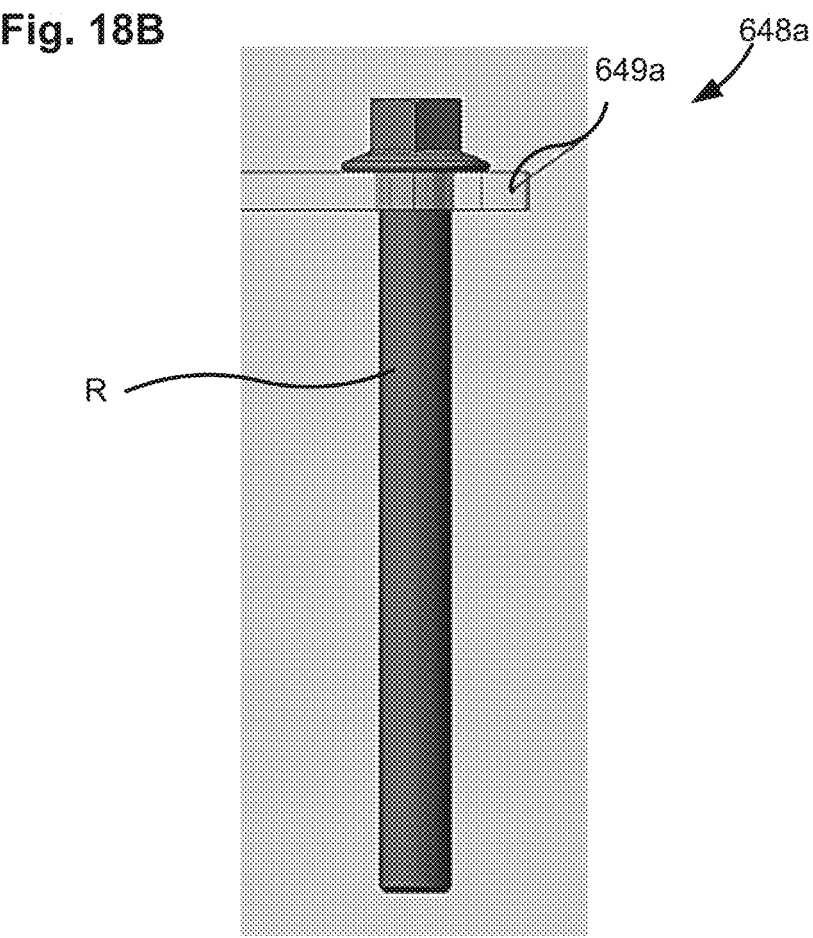
FIG. 18B is a side view of the gripper of FIG. 18A.

The first gripper 648a and the second gripper 648b can include clips, jaws, slots or any other mechanism for holding or otherwise gripping the replacement part R. FIGS. 18A and 18B show one embodiment of the first gripper 648a. The first gripper 648a includes a first leg 649a and a second leg 649b defining a slot therebetween, as shown in FIGS. 18A and 18B. The slot is configured to hold or otherwise grip the replacement part R. The slot extends from one end of the first gripper 648a to a predetermined length of the first gripper 648a. In some embodiments, the slot is sized to be slightly smaller than a cross-section of the replacement part R. The first leg 649a and the second leg 649b are pulled slightly apart to increase the width of the slot to dispose the replacement part R therewithin. Once the replacement part R is disposed in the slot, the first leg 649a and the second leg 649b snap towards each other to grip the replacement part R therebetween.

In some embodiments, an enclosure can be disposed over the base 602. FIGS. 16-17 show an embodiment of an enclosure 660 disposed over the base 602. The enclosure 660 includes a semi-circular sidewall 662 disposed around the base 602 and a roof 664 disposed over the sidewall 662 parallel to the base 602. The enclosure 660 can also include a door (not shown) which can be closed once the replacement part R is positioned for imaging over the base 602. This allows imaging of the replacement part R inside the enclosure isolated from ambient light. In such embodiments, one or more lighting devices (e.g., incandescent lights or LED lights) can be included in the imaging system 600. The lighting devices can be disposed inside the enclosure 660 to provide suitable lighting for capturing high quality images of the replacement part R.

Use of the imaging system 600 can produce a number of images of the replacement part from numerous different angles and/or positions. For example, as explained above, a number of features of a replacement part are extracted from a sequence of images of the replacement part. The imaging system 600 can be used to generate the sequence of images of replacement parts. For example, the imaging system 600 can take images of a replacement every n degrees, such as, 10, 15, 30, 45 degrees, etc., of the movement of the second arm. In addition, the imaging system 600 can take images of the replacement part every m degrees, such as, 10, 15, 30, 45 degrees, etc., of the first arm's movement. Combining the movement of the first arm and the second arm with the image device capturing images, the sequence of images for the replacement part can be captured. In one embodiment, the image device names the images accordingly. For example, an image name can include the first arm position and the second arm position. A unique identifier can be used that corresponds with the replacement part. This allows the images to be easily processed after they have been captured.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

As used herein, the terms "about" and "approximately" generally mean plus or minus 10% of the stated value. For example, about 0.5 would include 0.45 and 0.55, about 10 would include 9 to 11, about 1000 would include 900 to 1100.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings and tables in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An imaging system, comprising:
a base;
an imaging assembly, comprising:
a first arm including a first arm first portion and a first arm second portion distal from the first arm first portion, the first arm pivotally mounted on the base at the first arm first portion on a first pivot mount,
a second arm including a second arm first portion and a second arm second portion distal from the second arm first portion, the second arm pivotally mounted on the first arm second portion at the second arm first portion on a second pivot mount
an imaging device mounted on the second arm second portion; and
a holder assembly, comprising:
a base mount mounted on a platform coupled to the base,
a strut coupled to the base mount, and
a gripper coupled to the strut, the gripper configured to grip a part, at least a portion of the gripper positioned over the base such that the part is in a line of sight of the imaging device,
wherein the first arm is rotatable at least partially around the part about a first rotational axis and the second arm is rotatable about the second pivot mount to rotate the imaging device around the part about a second rotational axis orthogonal to and rotatable about the first rotational axis such that the part is imaged from a plurality of angles by the imaging device.

2. The imaging system of claim 1, wherein the second arm is rotatable about the second pivot mount by an angle of 360 degrees.

3. The imaging system of claim 1, wherein the first arm is rotatable about the first pivot mount about a vertical axis of the imaging system.

4. The imaging system of claim 3, wherein the first arm is rotatable about the first pivot mount by an angle of 180 degrees.

5. The imaging system of claim 1, wherein the first arm includes a first arm third portion connecting the first arm first portion and the first arm second portion, the first arm third portion defining a radius of curvature of 90 degrees such that the first arm first portion is positioned proximal to the platform and the first arm second portion is positioned distal to the platform.

6. The imaging system of claim 5, wherein the second arm includes a second arm third portion connecting the second arm first portion to the second arm second portion, the second arm third portion defining a radius of curvature such that the second arm first portion is positioned distal to the platform and the second arm second portion is positioned proximal to the platform.

7. The imaging system of claim 1, further comprising:
an actuator coupled to the second arm, the actuator configured to displace the second arm at least one of proximally and distally relative to the part.

8. The imaging system of claim 7, wherein the actuator is a first actuator, the imaging system further comprising:
a second actuator mounted on the second pivot mount, the second actuator configured to rotate the second arm about the second pivot mount.

9. The imaging system of claim 1, further comprising:
an enclosure disposed over the base and around the imaging assembly.

10. The imaging system of claim 1, further comprising:
at least one storage drawer disposed beneath the base.

11. An imaging system, comprising:
a base;
an imaging assembly, comprising:
   a first arm including a first arm first portion and a first arm second portion distal from the first arm first portion, the first arm mounted on the base at the first arm first portion on a first pivot mount,
   a second arm including a second arm first portion and a second arm second portion distal from the second arm first portion, the second arm pivotally mounted on the first arm second portion at the second arm first portion on a second pivot mount, and
   an imaging device mounted on the second arm second portion on a second pivot mount;
a holder assembly, comprising:
   a base mount pivotally mounted on a platform coupled to the base;
   a first strut coupled to a first end of the base mount;
   a second strut coupled to a second end of the base mount opposite the first end, the first strut and the second strut extending parallel to a vertical axis of the system,
   a first gripper coupled to the first strut; and
   a second gripper coupled to the second strut,
wherein the first arm is rotatable at least partially around a part gripped by at least one of the first gripper and the second gripper about a first rotational axis and the second arm is rotatable about a second rotational axis orthogonal to the first rotational axis to rotate the imaging device around the part gripped such that the part is imaged from a plurality of angles.

12. The imaging system of claim 11, wherein the base mount is rotatable about a vertical axis of the holder assembly, the rotation configured to move at least one of the first gripper and the second gripper over the base and in line of sight of the imaging device.

13. The imaging system of claim 11, wherein each of the first gripper and the second gripper include a pair of legs defining a slot therebetween, the part disposed in the slot.

14. The imaging system of claim 12, further comprising:
a first stage coupled to the first strut, the first gripper coupled to the first stage; and
a second stage coupled to the second strut, the second gripper coupled to the second stage,
wherein, each of the first stage and the second stage are positioned orthogonal to the first strut and the second strut, the first stage extending in a first direction parallel to the base, and the second stage extending in a second direction parallel to the base opposite the first direction.

15. The imaging system of claim 11, wherein the second arm is rotatable about the second pivot mount by an angle of 360 degrees.

16. The imaging system of claim 15, wherein the first arm is pivotally mounted on the base at the first pivot mount.

17. The imaging system of claim 16, wherein the first arm is rotatable about the first pivot mount by an angle of 180 degrees.

18. An imaging system, comprising:
a base;
an imaging assembly, comprising:
   a first arm including a first arm first portion and a first arm second portion distal from the first arm first portion, the first arm pivotally mounted on the base at the first arm first portion on a first pivot mount,
   a second arm including a second arm first portion and a second arm second portion distal from the second arm first portion, the second arm pivotally mounted on the first arm second portion at the second arm first portion on a second pivot mount,
an imaging device mounted on the second arm second portion; and
a holder assembly, comprising:
   a base mount pivotally mounted on a platform coupled to the base,
   a first strut coupled to a first end of the base mount,
   a second strut coupled to a second end of the base mount opposite the first end of the base mount, the first strut and the second strut extending parallel to a vertical axis of the system,
   a first gripper coupled to the first strut, and
   a second gripper coupled to the second strut,
   the base mount rotatable about its pivot mount on the platform about the vertical axis of the system, rotation of the base mount configured to move at least one of the first gripper and the second gripper over the base and in line of sight of the imaging device,
wherein the first arm is rotatable at least partially around a part gripped by at least one of the first gripper and the second gripper about a first rotational axis and the second arm is rotatable about a second rotational axis orthogonal to the first rotational axis to rotate the imaging device around the part such that the part is imaged from a plurality of angles.

19. The system of claim 18, wherein the first arm includes a first arm third portion connecting the first arm first portion and the first arm second portion, the first arm third portion defining a radius of curvature of 90 degrees such that the first arm first portion is positioned proximal to the platform and the first arm second portion is positioned distal to the platform.

20. The system of claim 19, wherein the second arm includes a second arm third portion connecting the second arm first portion to the second arm second portion, the second arm third portion defining a radius of curvature such that the second arm first portion is positioned distal to the platform and the second arm second portion is positioned proximal to the platform.

* * * * *